(12) United States Patent
Sampson

(10) Patent No.: US 6,804,687 B2
(45) Date of Patent: Oct. 12, 2004

(54) FILE SYSTEM MANAGEMENT WITH USER-DEFINABLE FUNCTIONAL ATTRIBUTES STORED IN A TOKEN ACTION LOG

(76) Inventor: Scott E. Sampson, 652 S. 250 West, Orem, UT (US) 84058

(*) Notice: Subject to any disclaimer, the term of this patent is extended or adjusted under 35 U.S.C. 154(b) by 0 days.

(21) Appl. No.: 10/443,293

(22) Filed: May 22, 2003

(65) Prior Publication Data

US 2004/0064434 A1 Apr. 1, 2004

Related U.S. Application Data

(63) Continuation-in-part of application No. 10/382,042, filed on Mar. 5, 2003.
(60) Provisional application No. 60/415,321, filed on Sep. 30, 2002.

(51) Int. Cl.[7] .............................................. G06F 17/30
(52) U.S. Cl. ....................... 707/200; 707/101; 705/51; 705/52
(58) Field of Search .............................. 707/100, 101, 707/200, 205, 206; 705/51, 52

(56) References Cited

U.S. PATENT DOCUMENTS

| | | | |
|---|---|---|---|
| 5,063,523 A | 11/1991 | Vrenjak | 709/223 |
| 5,499,358 A | 3/1996 | Nevarez | 707/101 |
| 5,628,007 A | 5/1997 | Nevarez | 707/101 |
| 5,958,005 A * | 9/1999 | Thorne et al. | 709/202 |
| 6,032,216 A * | 2/2000 | Schmuck et al. | 710/200 |
| 6,088,720 A * | 7/2000 | Berkowitz et al. | 709/206 |
| 6,122,631 A * | 9/2000 | Berbec et al. | 707/9 |
| 6,301,608 B1 | 10/2001 | Rochkind | 709/206 |
| 6,324,569 B1 * | 11/2001 | Ogilvie et al. | 709/206 |
| 6,397,261 B1 | 5/2002 | Eldridge et al. | 709/299 |
| 6,484,197 B1 * | 11/2002 | Donohue | 709/206 |
| 6,505,300 B2 | 1/2003 | Chan et al. | 713/164 |
| 6,549,950 B2 * | 4/2003 | Lytle et al. | 709/246 |
| 6,618,716 B1 * | 9/2003 | Horvitz | 706/55 |
| 2002/0049961 A1 * | 4/2002 | Fang et al. | 717/127 |
| 2002/0099665 A1 | 7/2002 | Burger et al. | 705/67 |
| 2002/0174010 A1 * | 11/2002 | Rice | 705/14 |
| 2003/0182332 A1 * | 9/2003 | McBrearty et al. | 707/206 |

* cited by examiner

Primary Examiner—Srirama Channavajjala
Assistant Examiner—Khanh Pham
(74) Attorney, Agent, or Firm—Kory D. Christensen; Stoel Rives LLP

(57) ABSTRACT

A file system or other system that manages information entities includes a subsystem to store one or more tokens, as well as a token action log to associate each token with a customizable set of one or more actions, where each token is to trigger the associated set of one or more actions in response to accompanying a file-system/information entity that experiences an event. The file system also includes a token log manager, which initiates the appropriate actions corresponding to file-system entities that experience an event.

58 Claims, 21 Drawing Sheets

| | Token | Description | Actions (tied to ### events ###) |
|---|---|---|---|
| 402 | construction | File pertains to new building construction project. | ### after project complete ## move {filepath}/{filename} /archive |
| 404 | archive | File should be archived before deleted. | ### before file delete ### copy {filepath}/{filename} /archive |
| 406 | readonly | File should not be overwritten or deleted. | ### before file delete ### error("readonly"); cancel; ### before file overwrite ### error("readonly"); cancel; |
| 408 | temporary | File should be deleted after use to free up disk space. | ### (10 days) after last file access ### rm "{filepath}/{filename}"; |
| 410 | important | Important file. | ### before file delete ### if (confirm("Delete important file?")) {archive(file);} else {cancel;} ### after file closed ### backup(file); |
| 412 | annual | File is reconstructed annually. | ### (365 days) after file created ### rm "{filepath}/{filename}"; |

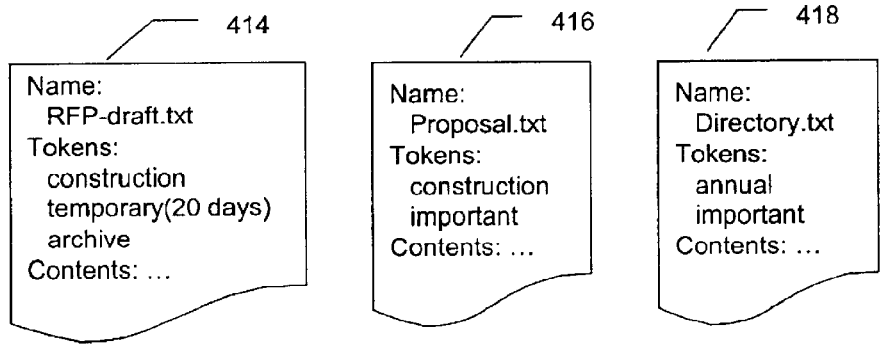

414
Name:
  RFP-draft.txt
Tokens:
  construction
  temporary(20 days)
  archive
Contents: ...

416
Name:
  Proposal.txt
Tokens:
  construction
  important
Contents: ...

418
Name:
  Directory.txt
Tokens:
  annual
  important
Contents: ...

FIG. 4

| | Token | Description | Actions |
|---|---|---|---|
| 502 | construction | File pertains to new building construction project. | treat(project); |
| 504 | training | File pertains to the new training project | treat(project);<br>### after file save ###<br>prompt("Remember to send updates to the training team.") |
| 506 | everest | File pertains to an expedition to climb Everest. | treat(project);<br>treat(personal); |
| 508 | passwords | File contains passwords for online accounts. | treat(personal);<br>treat(secret); |

| | Treatment | Description | Actions |
|---|---|---|---|
| 510 | project | File pertains to a project. | ### after project complete ##<br>move {filepath}/{filename} /archive |
| 512 | personal | File is personal (not work related) | ### before file opened ###<br>if(not confirm("Password?")) cancel;<br>### before file printed ###<br>set(watermark,"Personal") |
| 514 | secret | File is secret. | ### before file save ###<br>encrypt(file); |

FIG. 5

| setting id | title | description | value defaults | [event + lag days] | conditions | actions |
|---|---|---|---|---|---|---|
| ro-no | No Overwrite | Read only - no overwrite | | [before file written] | | alert("File is read only"); cancel; |
| ro-nd | No Delete | Read only - no delete | | [before file deleted] | | alert("File is read only"); cancel; |
| temp | Temporary | Delete file {days} days after last used. | 7 | [after file accessed + {days} days] | | delete(file); |
| imp | Important | Confirm before deleting, and archive to {folder}. | archive | [before file deleted] | | if(confirm("Delete important file?")) {move(file, {folder});} else {cancel;} |
| ab | Auto-backup | Backup file to {folder} when closed. | | [after file closed] | | copy(file, {folder}); |
| prj-cmp | Project Complete | Archive file to {folder} when project complete. | project-archive | [after project completed] | | move(file, {folder}); |
| prsnl | Personal | Require password {password} to open file. | | [before file opened] | prompt("File open password?") <> {password} | alert("Incorrect password"); cancel; |
| encrypt | Encrypt File | Encrypt file when saved. | | [after file saved] | | encrypt(file); |

FIG. 21

FILE SYSTEM MANAGEMENT WITH USER-DEFINABLE FUNCTIONAL ATTRIBUTES STORED IN A TOKEN ACTION LOG

RELATED APPLICATIONS

This application is related to and claims the benefit of U.S. Provisional Application No. 60/415,321, filed Sep. 30, 2002, for "Function and Use of a Token Action Log," with inventor Scott E. Sampson, which application is incorporated herein by reference in its entirety. This application is also a continuation-in-part of U.S. patent application Ser. No. 10/382,042, filed Mar. 5, 2003, for "Communication Management Using a Token Action Log," with inventor Scott E. Sampson, which application is likewise incorporated herein by reference in its entirety.

COPYRIGHT NOTICE

© 2003 Scott E. Sampson. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

TECHNICAL FIELD

The present invention relates generally to electronic file systems. More specifically, the present invention relates to a system and method for managing files using a token action log.

BACKGROUND OF THE INVENTION

In the 1980s, personal computers of various types became popular in business and home settings. Originally, a person's electronic files could be kept on removable "floppy disks" that had limited storage. Soon, higher-density disk storage became popular since it allowed people to store larger quantities of files. The cost of disk storage continues to drop, providing little incentive to curb the proliferation of files.

However, the incentive to curb the proliferation of files is that file systems can become unmanageable. Finding files can be a major chore. The systems for indexing files on content or other information are less than fulfilling. Such systems require that the user at least know enough about the file to find it. Unspecific searches can result in numerous files to sort through before finding the file or files of interest.

File systems can also require great effort to maintain because files and other stored entities have differing value to the system operators. What is needed is a way to identify which files have what value.

Most file systems allow a specific set of attributes to be attributed to individual files. For example, some files may be marked "read-only," meaning that they can be read but not overwritten. Other files may be marked "hidden," meaning that they are not to appear on normal directory listings.

Many files systems also allow other file attributes such as the author or the modification date. Such attributes are primarily informational, not functional. For example, a file by one author does not automatically behave differently in the file system from a file by another author. Informational attributes can nevertheless be useful as a file search criteria (e.g. searching for files by a particular author).

SUMMARY OF THE INVENTION

The present invention extends files systems or programs that operate on file systems by allowing individual files to possess arbitrary attributes that point to customizable actions. These attributes control the behavior of the file system under specified conditions.

In one embodiment, a file system includes a method for creating and storing one or more tokens and a token action log to associate each token with a customizable set of one or more actions. Each token is to trigger the associated set of one or more actions in response to accompanying a file-system entity that experiences an event. File events occur in conjunction with usual functions of the file system or in conjunction with programs that utilize the file system. Events might include accessing a file, deleting a file, opening a file, copying a file, printing a file, emailing a file, backing up a file, moving a file, creating a file, receiving a file from an external source, overwriting a file, modifying a file, etc. Other events might be time dependent, such as a certain period of time passing since an event occurred.

The "token action log" that associates tokens with actions could be called by other names, such as "token repository," "token registery," "token register," etc. However, the name "token action log" (abbreviated: TAL) will be used herein, or "token log" for short.

In one embodiment, the operator of the file system instructs a program that might be called a "token log manager" (TLM) to store a token as a meaningful or arbitrary symbol. For example, a token might be created to flag all files pertaining to a certain project. The token would be stored in the token action log (TAL), along with desired actions corresponding to given file events. For example, when the project is completed, any files pertaining to that project should be archived and deleted from the file system. The event is the completion of the project, which may be indicated by passing a certain time, or indicated by the operator. The token for that project would therefore be attached to or otherwise associated with any files pertaining to that project. At the event signifying the completion of the project, the TLM would initiate the actions recorded in the TAL for the relevant files.

Other tokens might be created for files of a particular worth. For example, a token might be created for "temporary" files. The corresponding action recorded in the TAL might be to delete the file if five days have passed since the last time the file was accessed. As such, any file associated with the "temporary" token will be automatically deleted if not accessed for five days, freeing up disk space.

As another example, a token might be created for "important" files. The corresponding action recorded in the TAL might be to not allow the file to be deleted without first confirming with the file system operator, or automatically backing up the file if modified and not backed up within a pre-specified interval.

As still another example, a token might be created for "confidential" files. The corresponding action recorded in the TAL might be prompting the user before allowing the file to be transmitted outside of the file system (such as via email), or requiring that the user be authenticated before allowing him or her to open the file, or automatically printing the word "confidential" on the paper when the file contents are printed.

As yet another example, a token might be created to automate functions of program execution within the file system. A token might be created with actions to open a task list upon the event of a program file being executed. That "open task list" token might then be attached to program files that the operator would like to be used with the task list. When those program files are executed, the token log manager would identify the "open task list" token and open the task list, perhaps even highlighting those activities within the task list pertaining to the attached program file.

Alternatives to the "open task list" token concept may be "open recently-edited files list" token (to automatically show a list of recent files that can be edited by the program file), or an "open bookmarks list" token (to automatically show a list of files or other documents that have been bookmarked by the operator).

Additional aspects and advantages of this invention will be apparent from the following detailed description of preferred embodiments, which proceeds with reference to the accompanying drawings.

BRIEF DESCRIPTION OF THE DRAWINGS

FIG. 4 shows examples of tokens that might be recorded in a TAL;

FIG. 5 shows examples of standard treatments that might be referred to by entries in a TAL;

FIG. 21 is an example of common settings that might be used in one embodiment of a TLM system.

DETAILED DESCRIPTION

Figure 1:
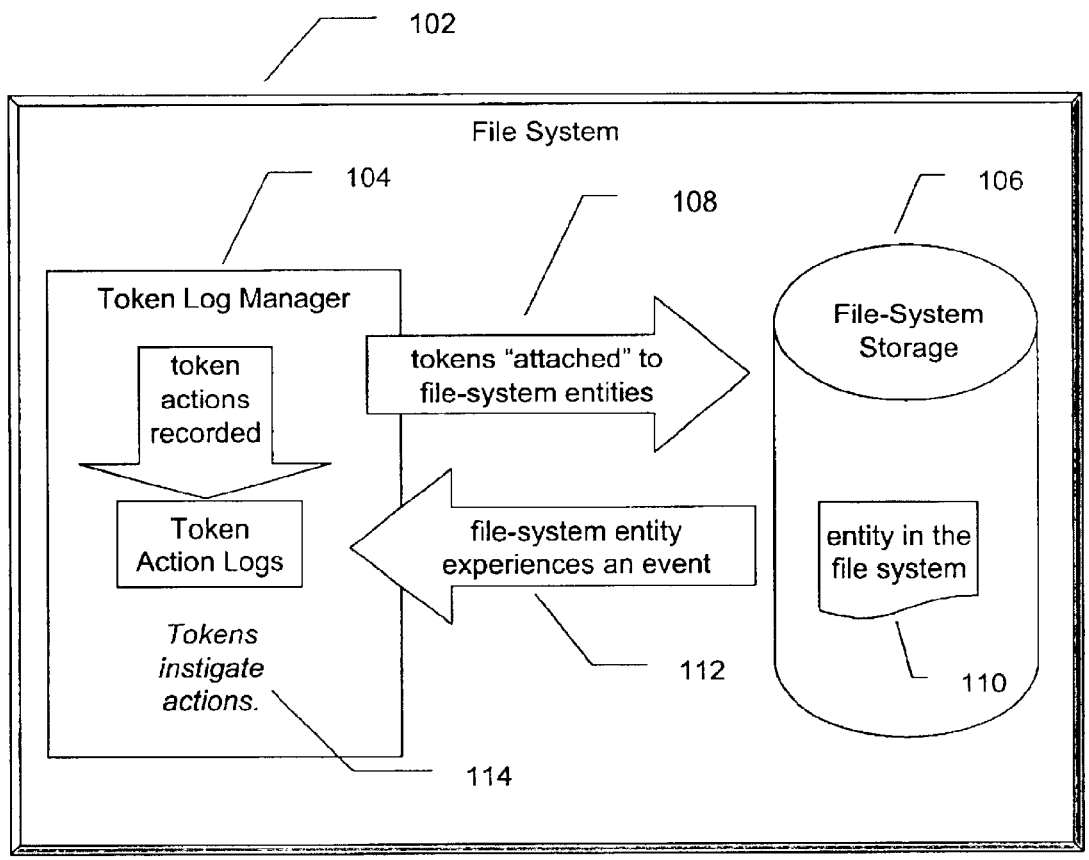
FIG. 1 is a basic block diagram of a token and a Token Action Log (TAL) within a file system.

Reference is now made to the figures in which like reference numerals refer to like elements. For clarity, the first digit or digits of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or not described in detail to avoid obscuring aspects of the invention. Furthermore, the described features, structures, or characteristics may be combined in any suitable manner in one or more embodiments.

While the following description uses numerous examples involving file-system management, those of skill in the art will recognize that the principles disclosed herein are also applicable to other fields. Similarly, while the following description makes frequent mention of "files," other types of "objects" are included within the scope of the invention.

Figure 2:
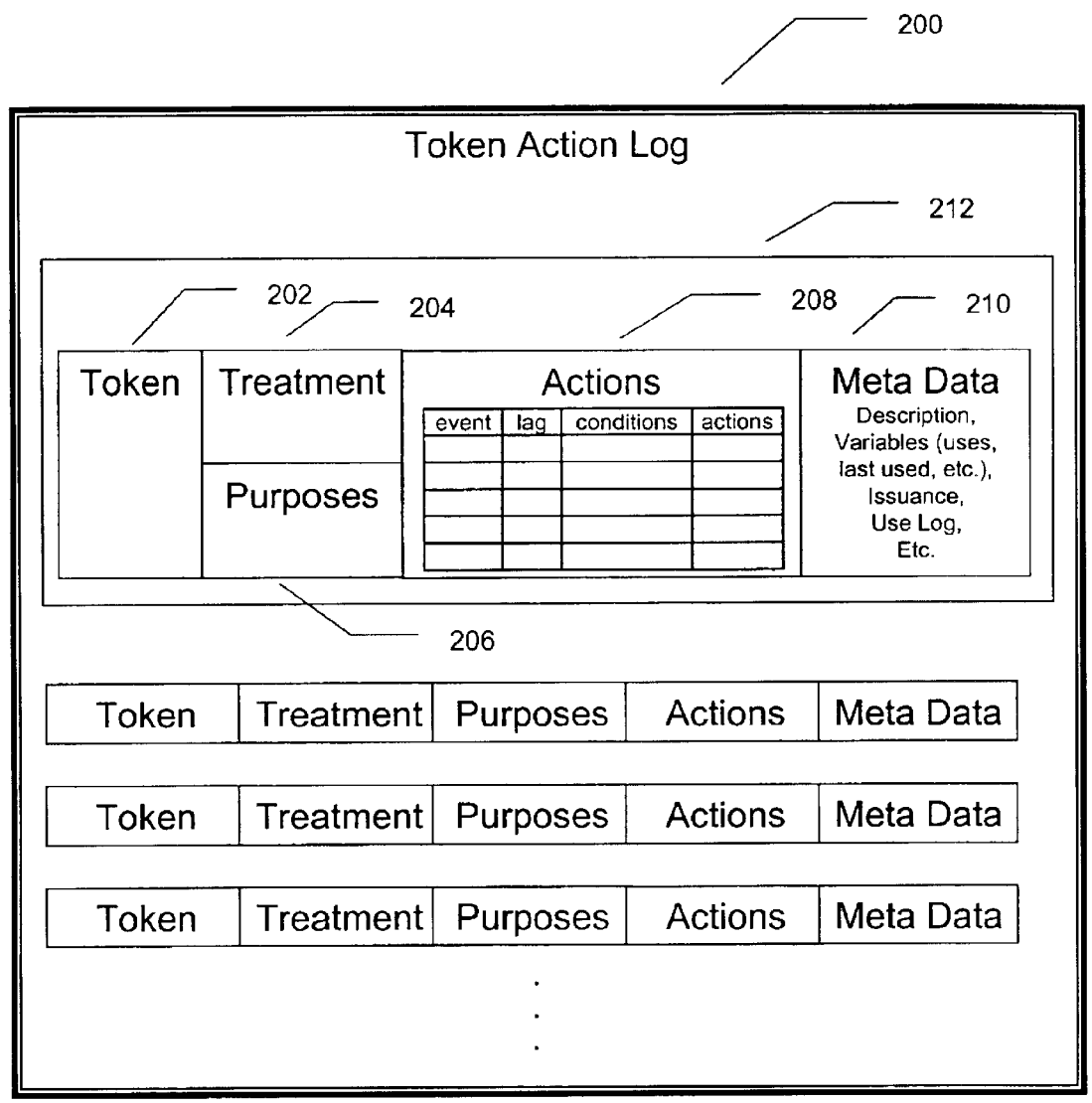
FIG. 2 is a block diagram of entries in a TAL.
Figure 20:
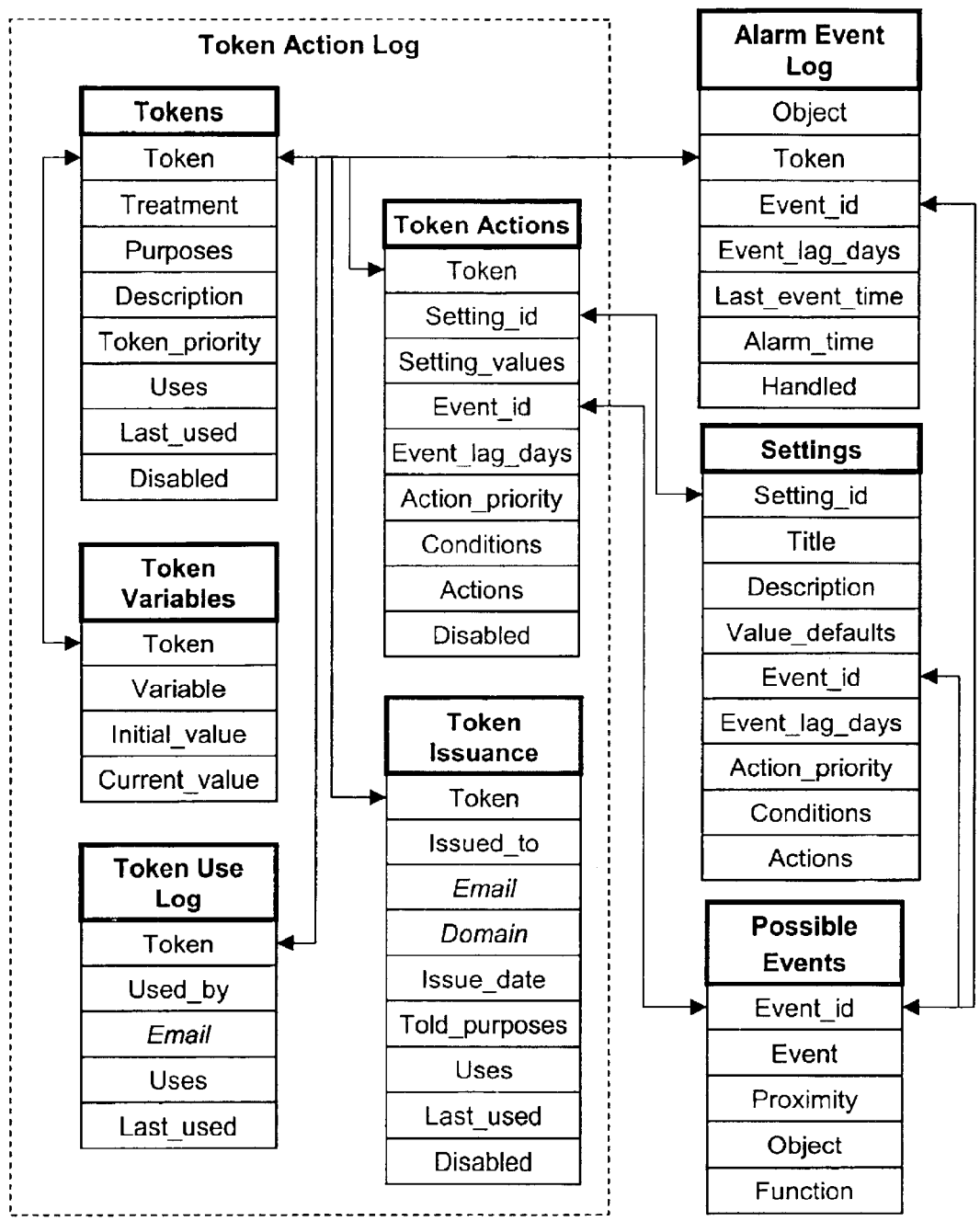
FIG. 20 is a data diagram that illustrates one embodiment of a TAL and related file structures.

FIG. 1 shows one embodiment of how a token log manager (TLM) would operate within a file system 102. The TLM 104 handles the storage and retrieval of entries in one or more Token Action Logs (TAL). Token Action Log entries can vary in complexity, depending upon the particular application of the invention. However, in one configuration, the TAL contains tokens (or token patterns) and actions corresponding to those tokens. The actions are initiated when the system entity with the token attached experiences an event. The events might be file system functions, such as an attempt to delete a file, or they might be chronological events, such as a specific amount of time passing since the file was accessed. FIG. 2 and FIG. 20 will further discuss a possible configuration of token action log entries.

When appropriate, the TLM attaches 108 one or more tokens to one or more entities stored in the file system storage 106. The "storage" might be disk storage, volatile memory storage (e.g. RAM), non-volatile memory storage (e.g. FLASH RAM), etc. This attaching of tokens might be initiated by the command of the file system operator. Alternatively, the attaching of tokens might be initiated by the action of a different token recorded in the token action log. The tokens can be "attached" to file-system entities in various ways. They may be recorded in the extended attributes of given files. In still other embodiments, they may be recorded in a data structure that indicates which tokens are considered to be "attached" to which file system entities. In this case, "attached" is taken to mean "associated" with the specific file-system entities.

When an entity in the file system, such as a data file 110, experiences an event, the TLM is consulted for processing of relevant tokens 112. The TLM identifies which tokens are "attached" to the given file system entity, looks up the appropriate entry in the TAL, determines the TAL entry actions for the given event, and instigates those actions 114. A wide range of actions are contemplated within the scope of the invention and will depend on the nature of the system in which the TLM operates. However, useful actions may include, for example, notifying the system operator, canceling the file system function, modifying the attached file, etc.

As illustrated in FIG. 2, a token action log 200 may be embodied as a data table including the following types of information:

The token 202 (or treatment, in the case of a standard treatments token action log), or a token pattern.

The standard treatment 204 that this particular token inherits actions from. Note that an entire token might assume all of the actions of a specific predefined standard treatment, or specific actions may point to one or more specific treatments, as discussed in FIG. 13.

The purpose(s) 206 of the token, including the intended purpose and/or the purpose communicated to the user.

Actions 208 initiated by this token. The actions may be specified according to function event and token state. Thus, each token recorded in the token action log will potentially involve multiple actions, with some actions corresponding to one event and other actions corresponding to other events. This is depicted in 208 by a data structure for the actions. This simple example of an action data structure includes events, conditions, and corresponding actions. There is the option as well for specifying a "lag" for given events, which would be the time period after the event occurs before the actions should be executed. An example is given in 408. Actions do not have to be kept within an imbedded data structure. The actions could be recorded, for example, in a simple text file format. However, storing actions in a data structure can help keep things organized and aid system performance.

Figure 3:
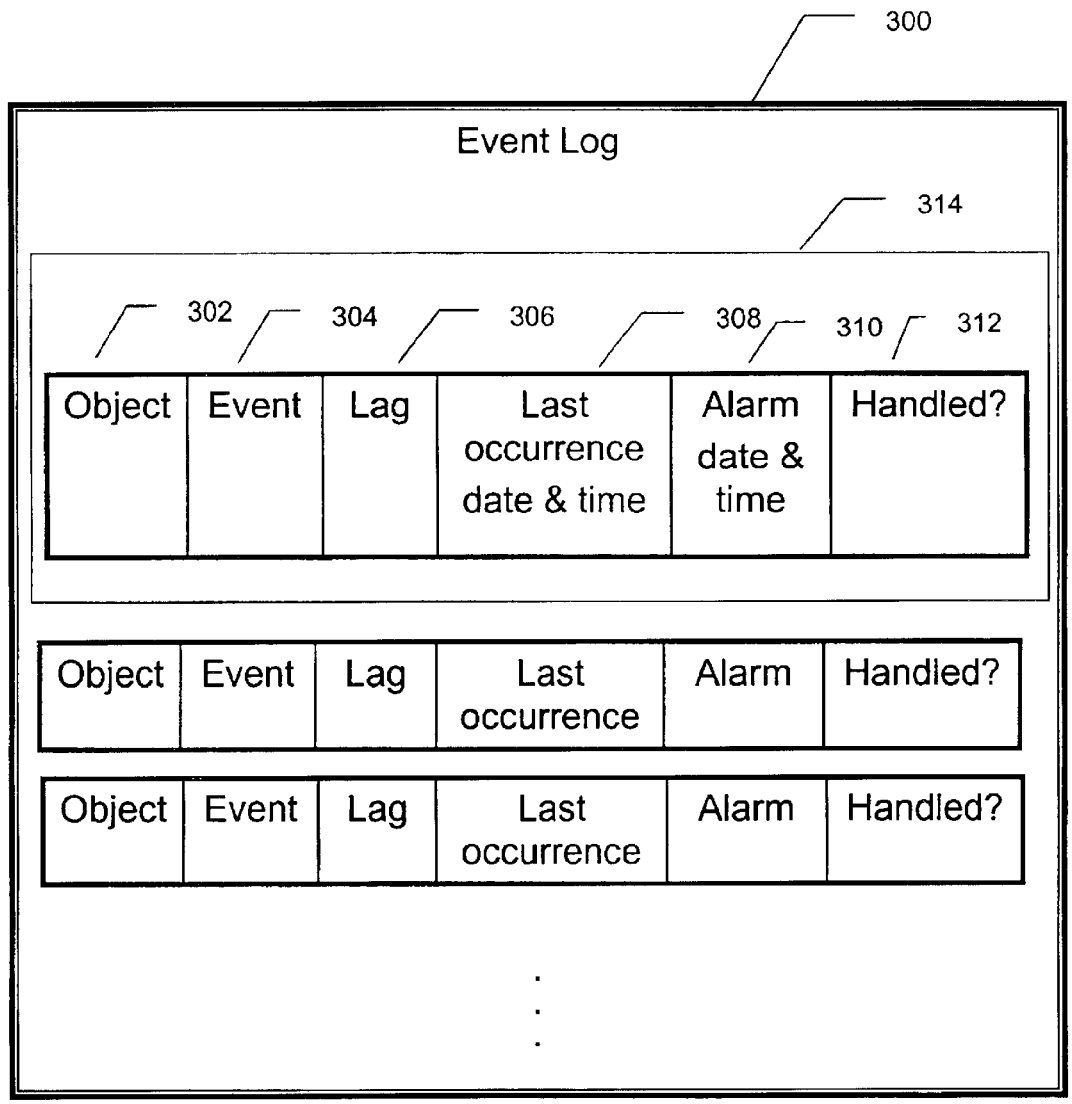
FIG. 3 is a block diagram of entries in an Event Log.

Meta data 210 about the token 202. Examples might include the creation date of the token 202 and/or a list of users this token has been sent to. In one embodiment, a date stamp may indicating when the token was most recently used. Such information can be recorded in the meta-data and/or it can be recorded in a Token Event Log, as depicted in FIG. 3. Either way, such information would be helpful in identifying old token entries that might be cleaned out (removed or archived) from the token action log.

The set of items of information for a given token or token pattern 202 constitutes a token action log entry 212. A TAL would contain one or more such entries. A more detailed example of the structure of a TAL in one embodiment is shown in FIG. 20.

Of course, the token action log 200 may be implemented using various types of data structures known to those of skill in the art. For example, the token action log 200 may be embodied as an XML document, one or more tables in a database, or the like.

FIG. 3 illustrates an Event Log 300, which relates but is different from the Token Action Log. The Event Log (EL) keeps track of when particular events occur involving particular tokens or other file system objects. An EL may be embodied as a data table including the following types of information:

An identifier of the object 302 undergoing the event. If the object is a file, the object identifier might be the full file name (including the file path). If the object is an email message, the object identifier might be the unique email message identifier. The identifier simply needs to be sufficient to identify the specific object undergoing the given event.

The event 304 being tracked for that object.

The time lag 306 after the last occurrence in which the alarm event should occur. This may, for example, be expressed in terms of days, where decimal values can represent portions of days.

Figure 14:
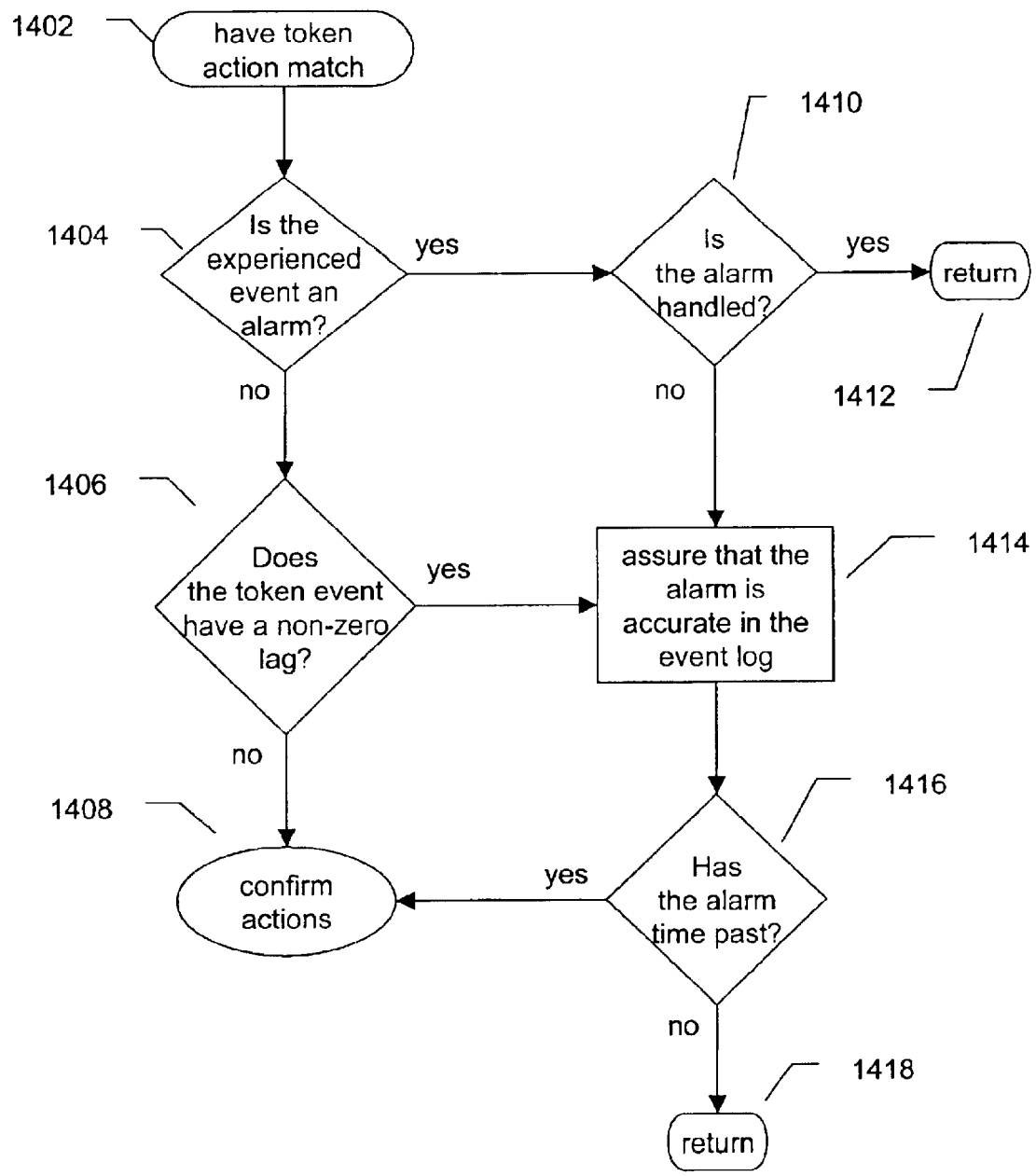
FIG. 14 is a flowchart of a procedure for checking if the given token event actions specify a time lag for action execution, and handling the updating of the event log.

The last date and time that the given object experienced that event 308. These values are updated by the TLM every time a given object experiences an event that is tracked in step 1414 of FIG. 14. Note that every event experienced by a given object does not necessarily need to be tracked in the Event Log. FIG. 14 shows that only events corresponding to lagged actions (and thus event alarms) need to be tracked in the Event Log. However, other events might be tracked, based on the configuration of the TLM or of specific TAL entries.

Figure 18:
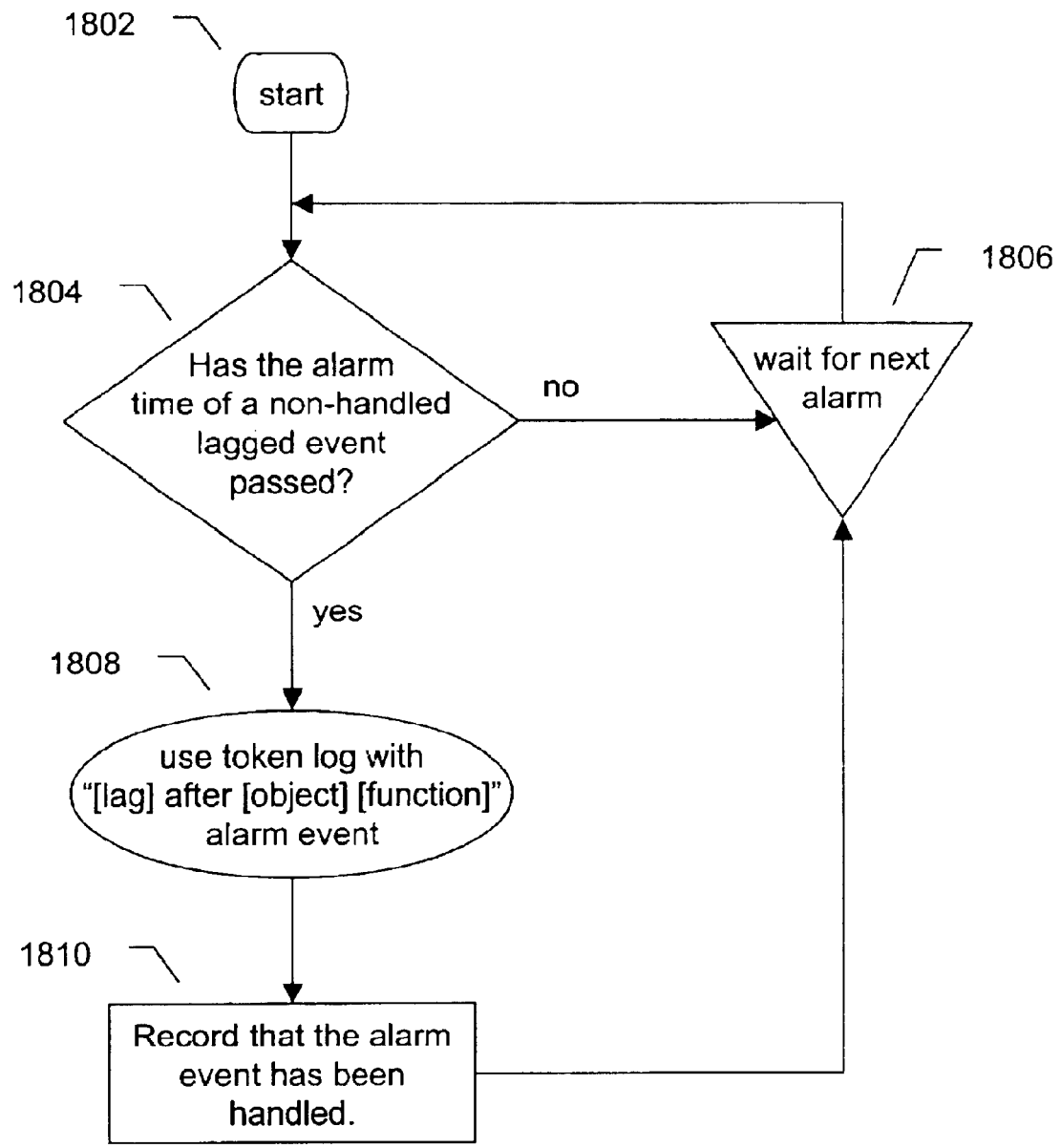
FIG. 18 is a dataflow diagram showing how an alarm event manager would initiate lagged events from the Event Log entries.

The alarm date and time 310. The alarm is calculated as the last occurrence value 306 plus the lag time 308. Note that the system polls these alarm times to know when to initiate the corresponding alarm events, as depicted in FIG. 18.

A flag as to whether the actions corresponding to the given alarmed event have already been handled 312. This is to prevent the system from inadvertently executing the actions corresponding to the given alarm event after the alarm event has already be handled. It can be beneficial to have the flag be the actual date and time the event was handled, for both reference and for access by other token events.

The configuration of an Event Log (or Alarm Event Log) is described again in FIG. 20. That figure also shows that the token itself might be recorded in the Event Log, which is helpful in identifying which token initiated the given alarm event.

FIG. 4 illustrates examples of useful token entries that may be recorded in a token action log, in one embodiment of the invention. Note that this is only a partial listing of TAL entries and fields, presented as an illustration.

Token action log entry 402 is a "construction" token for identifying file system entities pertaining to a particular construction project. The sample action shown is initiated at the event of the construction project being completed. When the TLM is notified that the event has occurred (i.e. that the construction project is complete), then any files with the "construction" token attached will be automatically moved to an archive directory in the file system.

Token action log entry 404 is a "archive" token that is attached to any files that are worthy of being archived before being deleted. If the file system is about to delete the file (as specified by the operator or by some program), the "before file deleted" event occurs. The TLM sees that the action for that event is to first copy that file to the archive directory. After that, the file system can proceed with the delete function as usual.

Token action log entry 406 is a "readonly" token that behaves like a traditional readonly file attribute, albeit as implemented via the TLM and TAL entry. An operator may attempt to delete or overwrite a file with the "readonly" token attached. However, the TLM observes that the TAL entry will override the delete or overwrite functions: first presenting an error message (titled "readonly"), and then canceling the file system function (and thus preventing the file from being deleted or overwritten).

Token action log entry 408 represents a token that is attached to "temporary" files. A file with this "temporary" token attached will automatically be deleted after a specified number of days has passed since the file was last accessed.

Token action log entry 410 represents a token that is attached to files considered to be "important." It prevents files from being deleted without confirmation, and automatically backs-up the file whenever it is closed from being edited.

Token action log entry 412 represents a token that is attached to files that are re-constructed on an annual basis. It automatically deletes (by the rm command) the file one year after it is created.

Items 414, 416, and 418 represents examples of files that have tokens attached. 414 has three tokens attached, one of which has token parameters. The parameter "(20 days)" indicates that the temporary token should assume a 20 day lag instead of the default 10 day lag. For files with multiple tokens, all matching tokens would pertain to that file unless the system was configured otherwise.

FIG. 5 illustrates examples of the use of Standard Treatments in token action log entries, in one embodiment of the invention. Note that this is only a partial listing of TAL and Standard Treatment TAL entries and fields, presented as an illustration.

Items 502 through 508 are example entries in a TAL that refer to Standard Treatments 510 through 514. The intent is to demonstrate how Standard Treatments might exist and be referenced in a TAL. Note that this is only one embodiment, and by no means restricts the language by which TAL actions refer to Standard Treatments.

Token action log entry 502 is a "construction" token, but here it points to a Standard Treatment for this being a project. The Standard Treatment 510 identifies the actions pertaining to that project.

Token action log entry 504 is a token for files pertaining to a "training" project. It is also treated as a project, but in addition, the TLM will remind the operator to send changes to the training team (for any files with the token attached).

Token action log entry 506 is a token for files pertaining to a project to climb Mount Everest. Since this is a personal project, it is treated both as a project 510 and as personal 512. Thus, it assumes the actions of both of those standard treatments.

Token action log entry 508 is a token for files containing "passwords" to log in to online accounts. It can be difficult to remember the personal passwords for all of the online accounts one is registered for, and dangerous to record those passwords where someone could find them. In one embodiment, the "passwords" token is attached to any files that contain a personal passwords. It is treated as both personal 512 and as secret 514. Of course, this assumes that the TLM and the token action log are kept secure, such as through encryption and file-access passwords (which should be standard practice).

Figure 6:
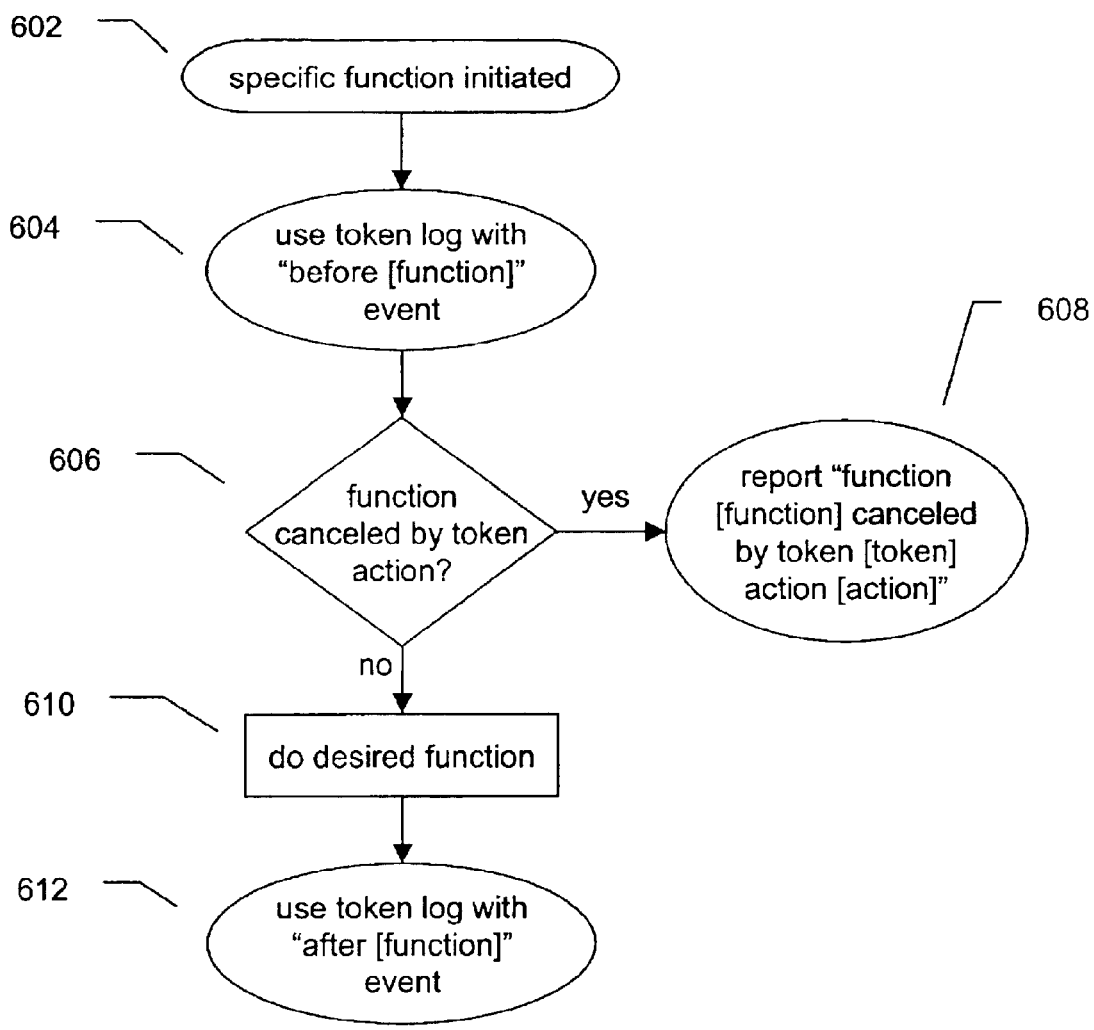
FIG. 6 is a flowchart of a procedure for initiating functions of the file system.

Referring to FIG. 6, the general use of token action logs can be described via a "Function Initiated" procedure, where a "function" can be any function of the host system. The "host system" is the system in which the TLM is incorporated. As used herein, the term "host system" is "a device, program, or system in which the given subsystem resides." Another name of the "host system" may be the "parent system."

The procedure begins when a function is initiated 602. The TLM is first called upon to "use the token action log" with the event "before [the given function]" 604. This checks for token actions to be performed before the given function is initiated, which is described in detail in subsequent figures. The token may actually cancel the function 606, in which case the function is not performed and the canceling of the function is possibly reported 608.

If the function is not canceled, the host system or TLM initiates the function 610. For example, the host system may be an email client that has a subroutine that deletes messages. If the TLM determines (via information in the token action log) that the delete function should be canceled, then the email client should not delete the message.

After a function is performed 610, the TLM again uses the token action log with the event "after [the given function]" 612, which checks for token actions to be performed after that function is performed.

The range of possible events triggering the use of a TLM is as wide as the range of possible applications. The events are typically affiliated with functions of the host system in which the TLM is incorporated.

As an example, a file system might have "before . . . " and "after . . . " events corresponding to the following types of functions:
  file created—a new file is created.
  file deleted—a file is deleted.
  file filed—a file is moved to a folder.
  file printed—a given file is printed.
  file archived—the file is copied to an archive location.
Any functions of any host system could trigger an event of relevance to the TLM.

An event "before [function]" might occur before a function of the host system is performed, and an event "after [function]" might occur after the function is performed. A primary distinction between the two types is that "before . . . " events may have the possibility of canceling the requested function, if the host system will allow the function to be cancelled. For example, the event "before file deleted" might be referred to the TLM. The given object experiencing the event might have a token attached that cancels the given file delete function, preventing the file from being deleted. Some host system functions may have no "before . . . " events. For example, an email message processing host system has a function of "message received," which the TLM can act on after the message is received, but without knowledge of the message before it is received.

Figure 7:
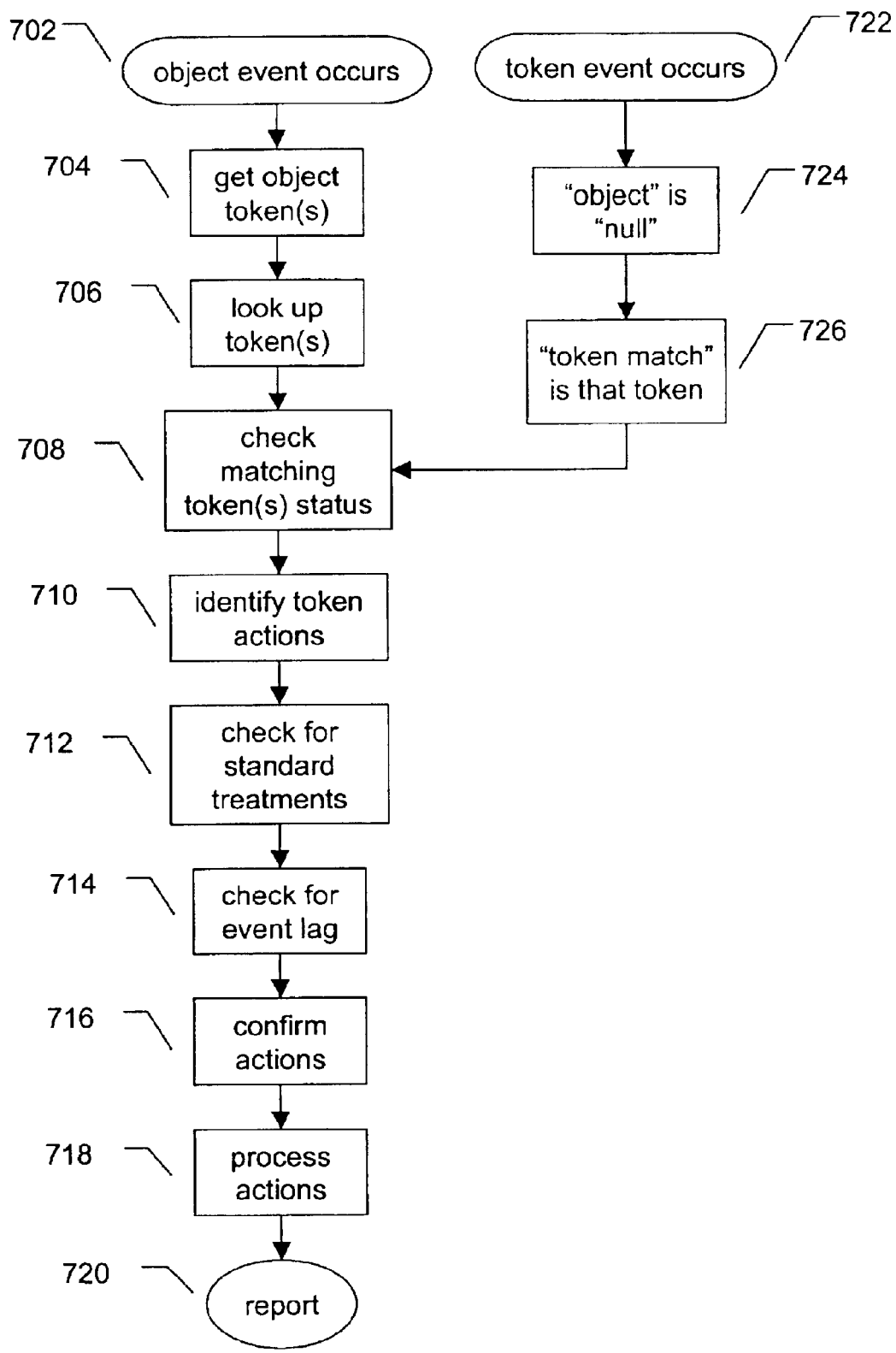
FIG. 7 is a flowchart of a procedure for using a TAL.

FIG. 7 shows one embodiment of a TLM procedure for using a Token Action Log. Referring to FIG. 7, there are two general classes of events involving tokens. The first is an object (such as a file) event which an event involving an object that may have one or more tokens attached. Examples of file-object events include: "before file deleted," "before file printed," "after file executed," etc. The second is a token event which is an event involving a token record in a token action log, independent of any other object, which is called a "token event." Note that this distinction is not restrictive, because a token itself is an object. The point is that an independent token that experiences an event is considered to be attached to itself.

If an object event occurs 702, the object (such as a data file) with any attached tokens are referred to the TLM for token processing. The TLM extracts any token(s) attached to the object 704. Then, the TLM looks up the token(s) in the token action log(s) 706. The TLM checks any matching tokens to see if they are expired or not 708, then identifies relevant actions 710. The TLM determines if the actions point to one or more standard treatments 712. The TLM checks to see if the given actions have a specified event lag 714, or if the event is an alarm even from a previously noted event lag. The TLM confirms the relevant token actions to be performed, as necessary 716. The resulting actions are processed 718. Finally, the outcome is reported to the token issuer, as desired 720.

As mentioned, it is possible that an event occurs that involves a token itself, but no other object 722. For example, if a token issuer attempts to delete a token, the event "before token deleted" occurs. In this case, the TLM is called with no other object except for the token (or tokens) itself. The "object" is "null," meaning there is no object 724. The TLM does not need to get the token 704, since the token is already determined. Instead, the token is assumed to be the given token, which is looked up in the token action logs 726. Otherwise, the procedure continues as usual with checking the token match for validity 708, etc.

Figure 8:
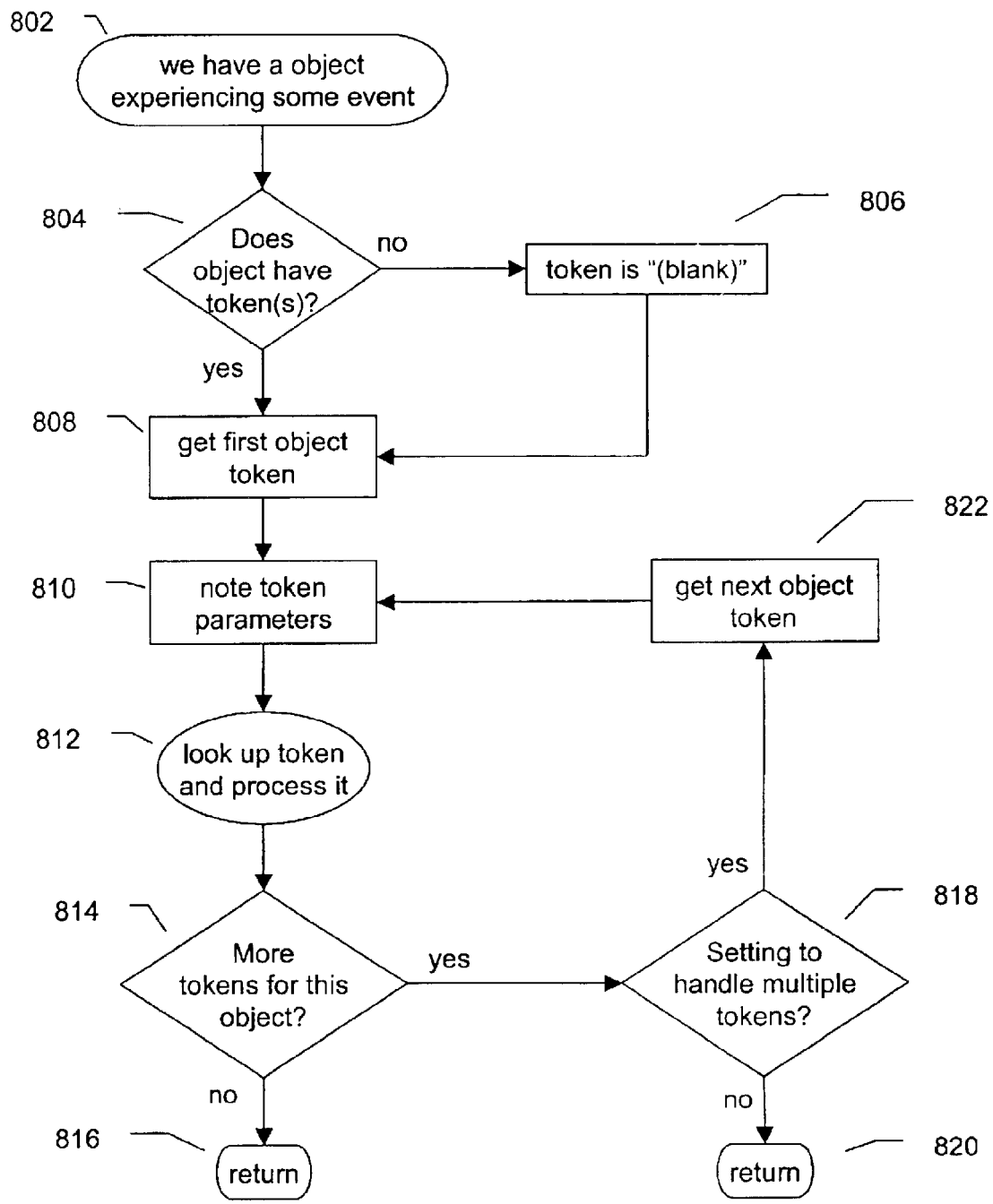
FIG. 8 is a flowchart of a procedure for obtaining tokens from files or other objects.

FIG. 8 is one embodiment of the "get object token(s)" procedure 704. This and subsequent figures consider the "object" being a "file," or some other file-system entity. The more general description of a "file" might be a data object of some sort, including but not limited to file directories, links to files, messages, media files, data structure entries, etc. Without loss of generality, the phrase "file-system entity" or the name of some object could be substituted for "object" or "file" in this and subsequent figures.

A file (again, this can be read "object" or "file-system entity") experiences some event, causing this procedure to be called 802. The file is checked to see if it has one or more tokens 804. If no token is found attached to the object 804, then the "token" is considered to be "(blank)" 806. A "(blank)" token is a token designated to match for files that have no token. This allows us to look up relevant actions for files that have no token attached.

If there is more than one token attached to the file, then it may be necessary to consider each. The procedure begins with the first token present 808. In the case of a "(blank)" token, the first file token is that "(blank)" token. Each token may include parameters 810, which should be noted by the TLM in case they are needed in processing the actions of the token.

The system then looks up the token in the token action log(s) and processes the relevant actions 814, which is detailed in subsequent figures. If there are no more tokens with this file 814, the procedure ends 816. (As used in the figures, the term "return" is used in a computer programming sense-to finish a sub-process and return to the calling process.)

If there are more tokens, the token issuer (i.e. the person configuring the TLM) may have set a setting to not handle multiple tokens 818, in which case the procedure ends 820. Otherwise, the next file token is retrieved 822 and the procedure repeats by cycling at the point of noting the subsequent token's parameters 810.

In many applications, it is sufficient for one token to be associated with a given file. However, other applications may benefit from multiple tokens being associated with given files. Various means for dealing with multiple tokens exist, depending on the implementation. Alternatives include:

The tokens can be processed in the order in which they are associated with the file.

The tokens can be processed in an order based on a priority indicated in the receiver's token action log. (see the description of FIG. 20)

Figure 9:
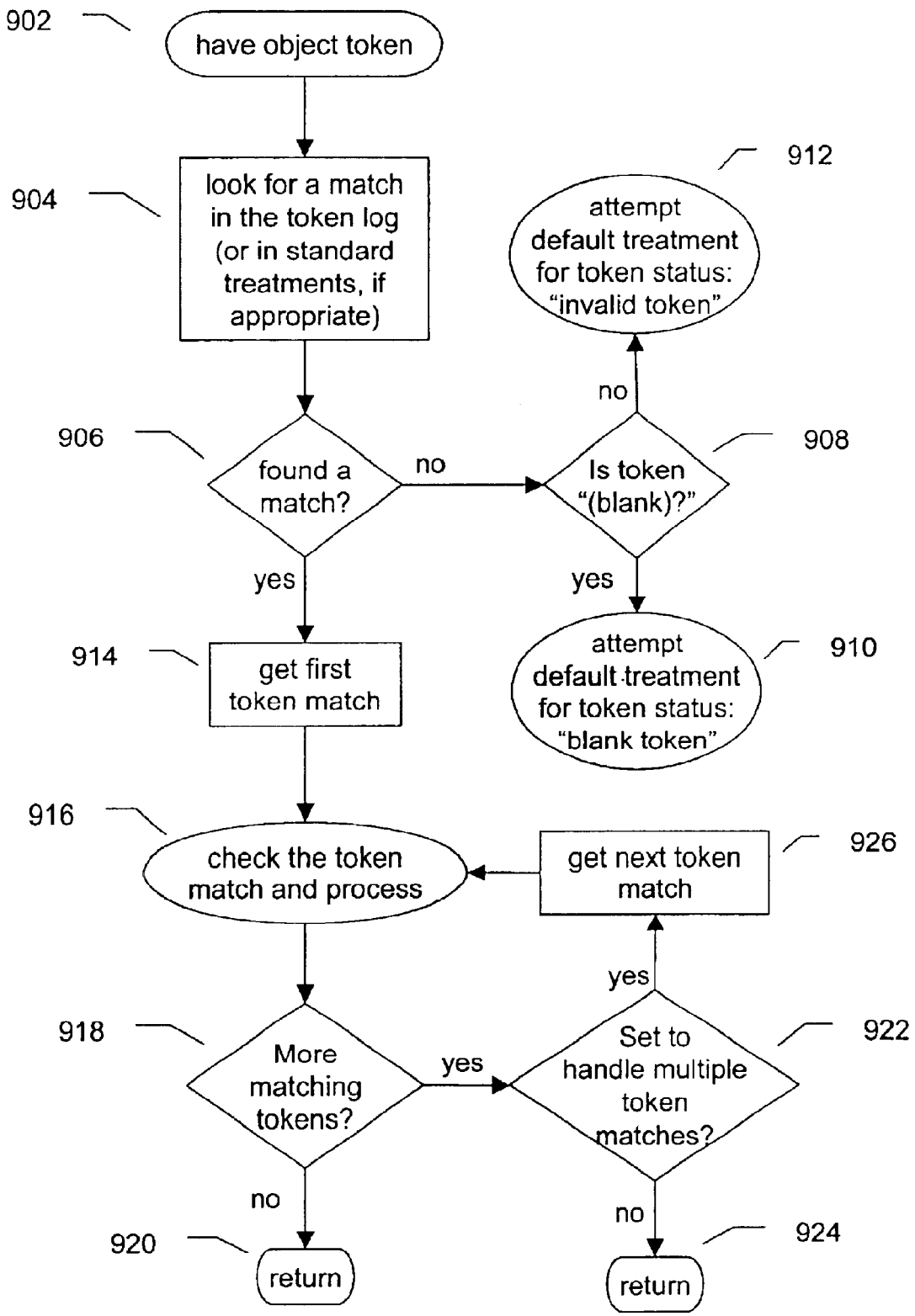
FIG. 9 is a flowchart of a procedure for looking up a token in a TAL.

FIG. 9 is one embodiment of the "look up token(s)" procedure 706. The procedure of FIG. 9 is called when a token has been identified and the token needs to be looked up in the system's token action log(s). The system begins this procedure by having an identified token 902 that needs to be looked up in the token action log(s). (Or the "(blank)" token meaning no token was attached to the file.) The system looks in the appropriate token action log to see if the token exists there 904.

In one embodiment, a TLM may have multiple token action logs. A TLM will typically have one (or more) primary token action log(s), and at one (or more) "Standard Treatments" log. "Standard treatments" is a token action log that defines actions for classes of tokens, rather than for individual tokens. Of course, a "Standard Treatments" log need not be implemented as a token action log.

Examples of Standard Treatments were shown in FIG. 5. The "token" in the standard treatments file may be the "treatment" name (e.g., "important"). One other valuable "treatment" is "default" which specifies default actions for files tokens that have no actions for a specific event and/or token status defined. Therefore, if this procedure is to look use "standard treatments" as the token action log, then the specific treatment name is used as the "token" to search for.

A "token match" is an entry in a token action log that matches the given token. That means that it matches not only the token (or, in the case of standard treatments, the treatment), but also other conditions for token use, as recorded in the TAL.

Referring to FIG. 9, if the token is not found in the token action log 906, then the TLM checks to see if the token is "(blank)," meaning there was no token attached to the file 908. If the token is "(blank)" then the TLM attempts to initiate a default treatment for this token given the token status "blank token" 910, which is detailed in a subsequent figure. If the token is not blank, then the TLM attempts to initiate the default treatment for that token given the token status "invalid token" 912.

In one embodiment, when the TLM considers a token attached to an object (or an independent token), it determines the token status. Note that the determination of token status may be accomplished as a permanent part of the TLM, or it may be accomplished through actions associated with one or more tokens in the TAL. A number of status values are possible within the scope of the invention:

blank token—since no token is attached to the file being process the (blank) token is considered, and the (blank) token is valid.

invalid token—the token (blank or non-blank) was not found in the token action log.

expired token—the token (blank or non-blank) was found in the token action log, but it was expired.

valid token—the token (blank or non-blank) was found in the token action log, and it was not expired.

misused token—a non-blank token that exists in the token action log but does not meet basic conditions for use. For example, a system operator may attempt to use the token without appropriate authorization.

expired token—a non-blank token that exists in the token action log but is expired.

invalid blank token—a blank token with no blank token entry in the token action log.

misused blank token—a blank token that exists in the token action log but does not meet basic conditions for use.

expired blank token—a blank token that exists in the token action log but is expired.

valid blank token—a blank token that is found in the token action log and meets all criteria for use (and is not expired).

There may be other specific token states representing specific ways a given token could be invalid. A general approach would be to have two primary token status values: valid and invalid. Then, there could be any number of secondary token status values for invalid tokens, specifying why the token is considered invalid, e.g.:

invalid: not found—token not found in the token action log invalid: bad user—token being used by an authorized user invalid: expired date—the token expiration date has passed invalid: expired uses—the token uses is less than one An advantage of that token status scheme is that it can easily employ wildcard characters in the token actions recorded in the token action log. For example, a given token action log entry might specify one action for invalid tokens due to an expired date (such as sending a file about when that expiration date was) and another action for all other invalid token status values. The token action log might include a first action entry (for the given function event) for "[[[invalid: expired date]]]" and a subsequent action entry for "[[[invalid: *]]]" where "*" is a wildcard indicating any match. (So-called "regular expressions" could also be used.) If the TLM system is configured to only act on the first matching action for a given token, then this setup of token actions will accomplish the desired system behavior.

Further, the token status could be multi-dimensional. The token status could contain the following elements:

validity=valid or invalid violation=reason(s) for invalidity presence=blank or non-blank.

Then, in the token action log the actions could be specified according to these elements, utilizing wildcards as desired (and default token status elements as appropriate). An identifier format in the token action log action could be [[[validity (violation) presence token]]], indicating action matches such as the following:

[[[valid blank token]]] matches a blank token that is found in the token action log.

[[[valid * token]]] matches a blank or non-blank token.

[[[invalid (*) non-blank token]]] matches any invalid non-blank token.

[[[invalid (expired date|expired uses)* token]]] matches any blank or non-blank token in the token action log that has an expired date or expired uses.

The appropriate token status value for a given token is determined by the procedures of the TLM. Whether such a more extensive list of possible token values would be beneficial depends on the context for TLM implementation.

In some cases, more than one entry in the token action log may match the given token. The TLM considers that possibility, and may begin with the first match 914. In one embodiment, a function of the TLM is to check the token to assure it is not expired, and to process the relevant actions 916, which is detailed in subsequent figures.

If there are no more matching entries in the token action log 918, the procedure ends 920. Otherwise, if the TLM administrator has set the TLM to handle not handle multiple matches 922, the procedure ends 924. If not, the TLM gets the next token action log entry match 926 and repeats at 916.

Figure 10:
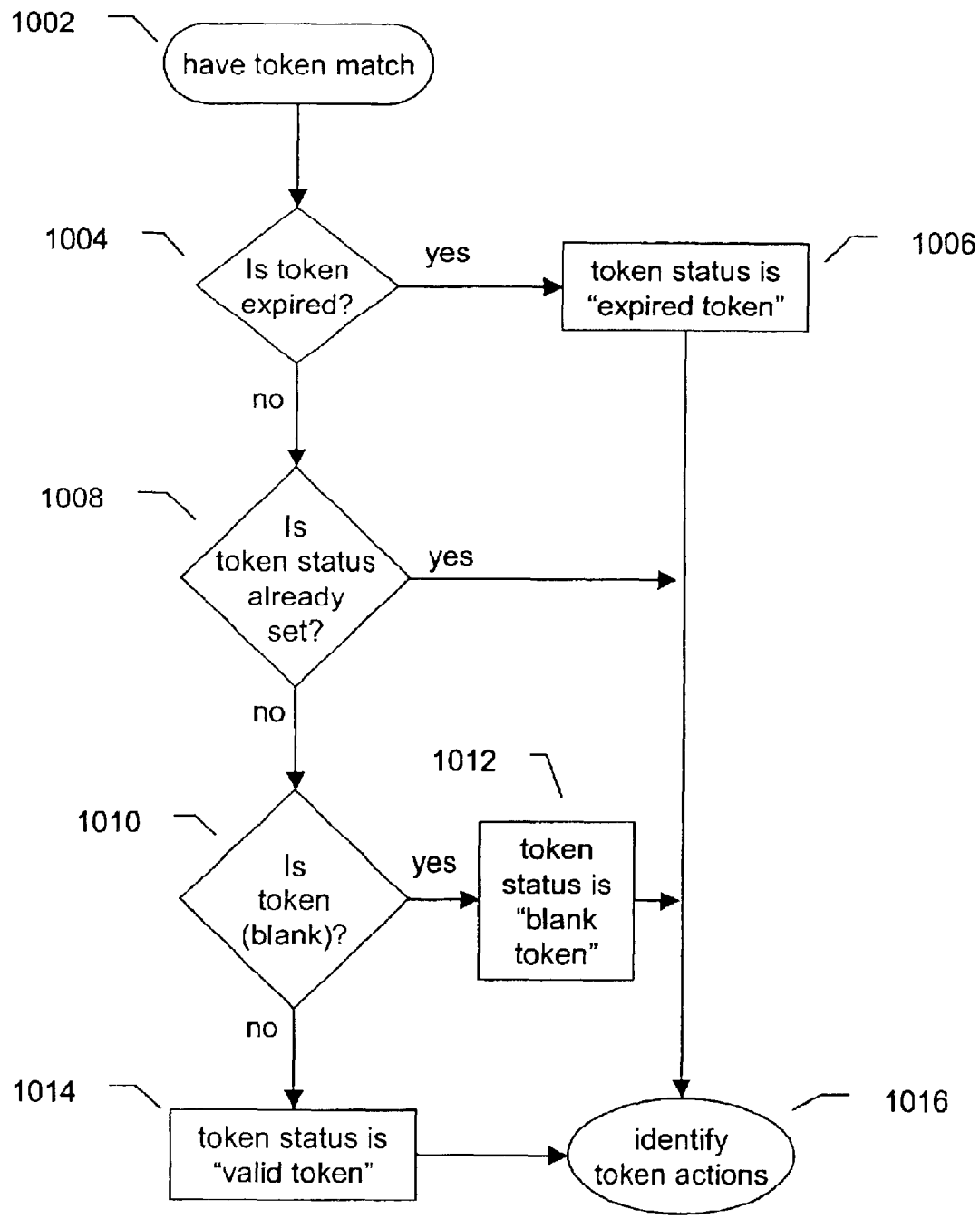
FIG. 10 is a flowchart of a procedure for checking a matching token to determine if it is valid.

FIG. 10 is one embodiment of the "check token match" procedure 708. Having a token match 1002 means that one or more entries in the token file matched the token under consideration (which could be a blank token or a non-blank token).

One purpose of the "check token match" procedure 708 is to determine whether the token has expired 1004, and to identify the correct token status. There are various ways a token can expire. For example, the expiration date on the token may have passed. Alternatively, the token may be authorized for only a set number of uses, and which number has been exceeded.

If the token match is expired by any expiration criteria, the token status is "expired token" 1006 and the system goes to the procedure to identify appropriate actions for that token status 1016 which is detailed in subsequent figures. If the token match does not meet expiration criteria, then the system either leaves the token status as it is 1008, or, if the token status is not set, the system sets the token status to the appropriate valid value. If the token is blank 1010, then the token status should reflect that the token is blank 1012. Note that a token status of "blank token" has the meaning "blank token that is valid (i.e. found in token action log and not expired)." If, however, the token is not blank, then the token status becomes "valid token" 1014, which has the meaning "non-blank token that is valid (i.e. found in token action log and not expired)." Regardless of the token status, the procedure proceeds to identify and process token actions 1016.

Figure 11:
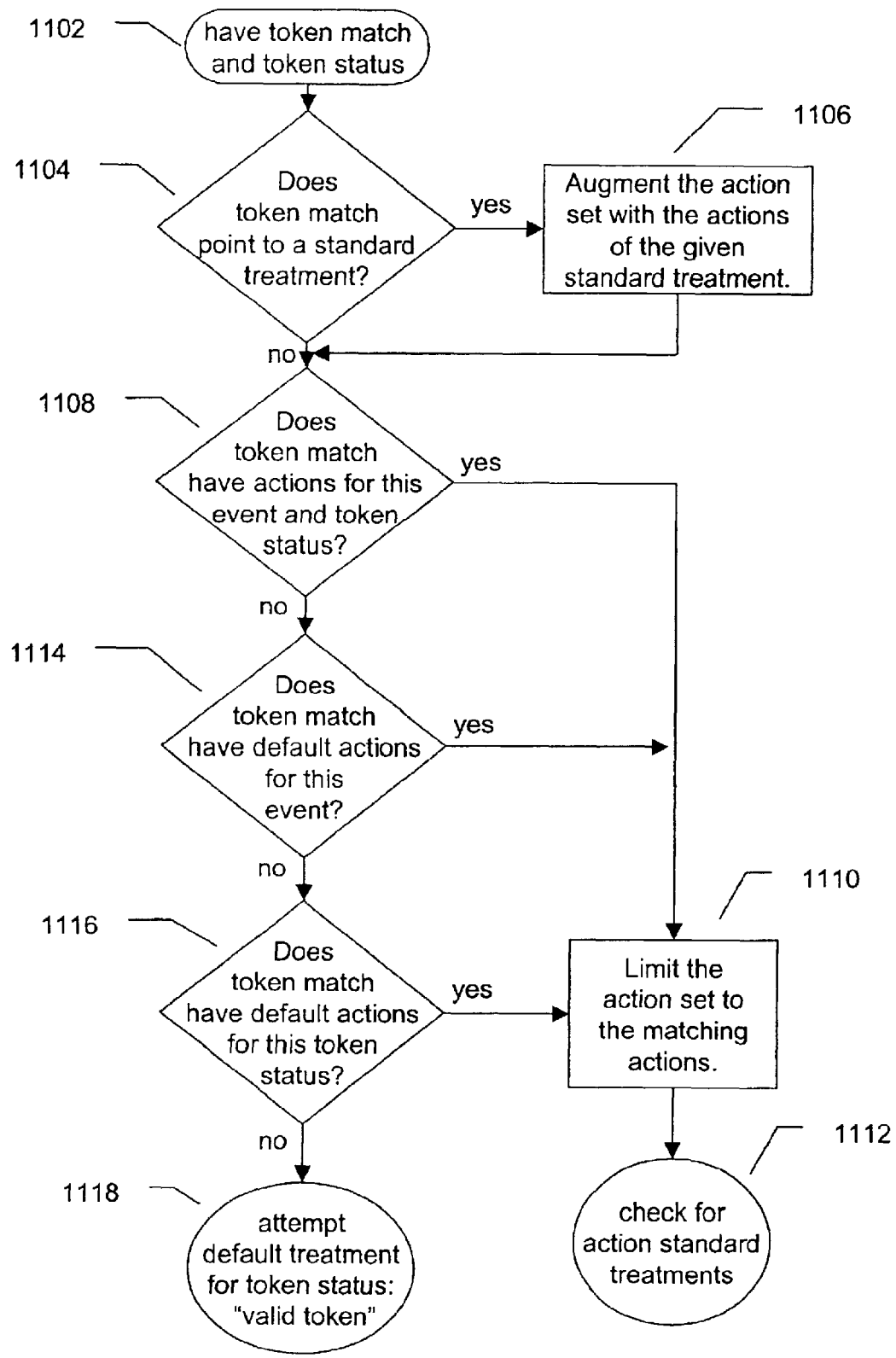
FIG. 11 is a flowchart of a procedure for identifying relevant actions for a given token.

FIG. 11 shows one embodiment of the "identify token actions" procedure 710 and proceeds from step 1016 of FIG. 10. A purpose of this procedure is to identify an action set for the given event and token status at step 1102. This includes looking for default actions, where appropriate.

In some cases, the token itself may point to a standard treatment. If such is detected 1104, then the action set for this token is augmented with the actions of the standard treatment 1106. In some cases, actions specific to the given token might override actions that are part of the standard treatment.

Next, the action set is reduced to those pertaining to the given event and given token status. A first possibility is if the token match itself contains actions for the given event and token status 1108. If there are actions defined in the token match, then the system uses those actions 1110 and proceeds to the next procedure to check for action-specific standard treatment 1112.

If the token match does not have actions defined for the given token match, there is still the possibility of default actions. First, the TLM can look for default actions for the given event 1114, which are invoked regardless of the token status. If none are found then the TLM can look for default actions for the given token status 1116 regardless of the event. Note that these last two steps can possibly be switched, should the system designer prefer to have token status take precedence over event in searching for default actions.

If none of those default actions are found in the given token action log, the procedure might still look for a default action in the "standard treatments" token action log 1118, which is described in the next figure.

Figure 12:
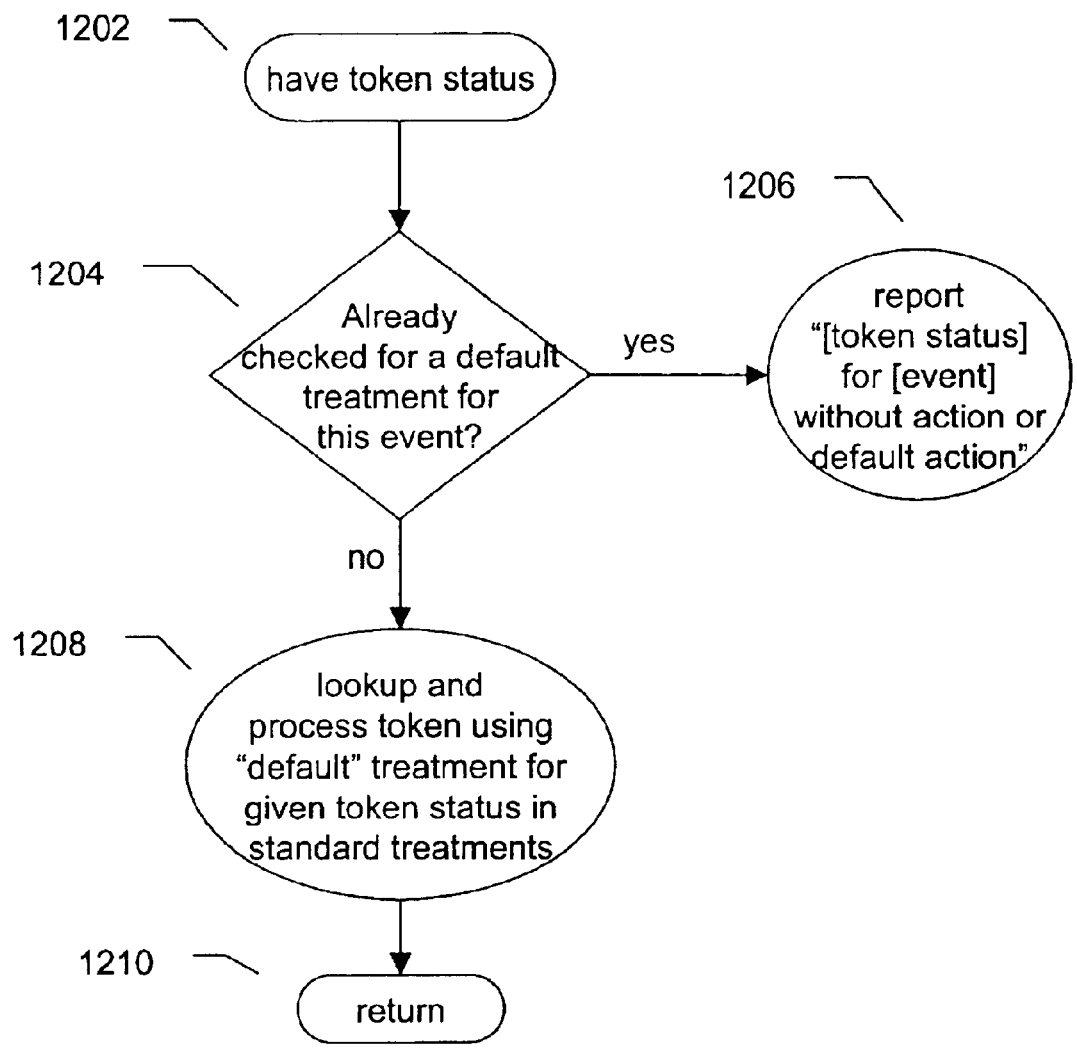
FIG. 12 is a flowchart of a procedure for identifying a default treatment where no action is otherwise specified.

FIG. 12 attempts to identify a default treatment. This procedures may be called from the prior procedure 1112 if it is desirable to check the "standard treatments" token action log for default actions. Since the prior procedure may already be looking in the "standard treatments" token action log, there may be a need to abandon this search 1204 to avoid infinite recursion. In other words, if no default treatment was found in the "standard treatments" token action log, then options for default actions have been exhausted, and the TLM may report such 1206.

If the TLM has not already checked for a default treatment in the "standard treatments" token action log, then it can look for such simply by calling the "look up token" procedure (described in a prior figure), specifying to look in "standard treatments" for the "default" treatment. Again, that is the last resort, so the TLM returns after that attempt 1210. This "return" means to return (to the calling process) an indicator as to whether or not the relevant token action resulted in canceling the action.

Figure 13:
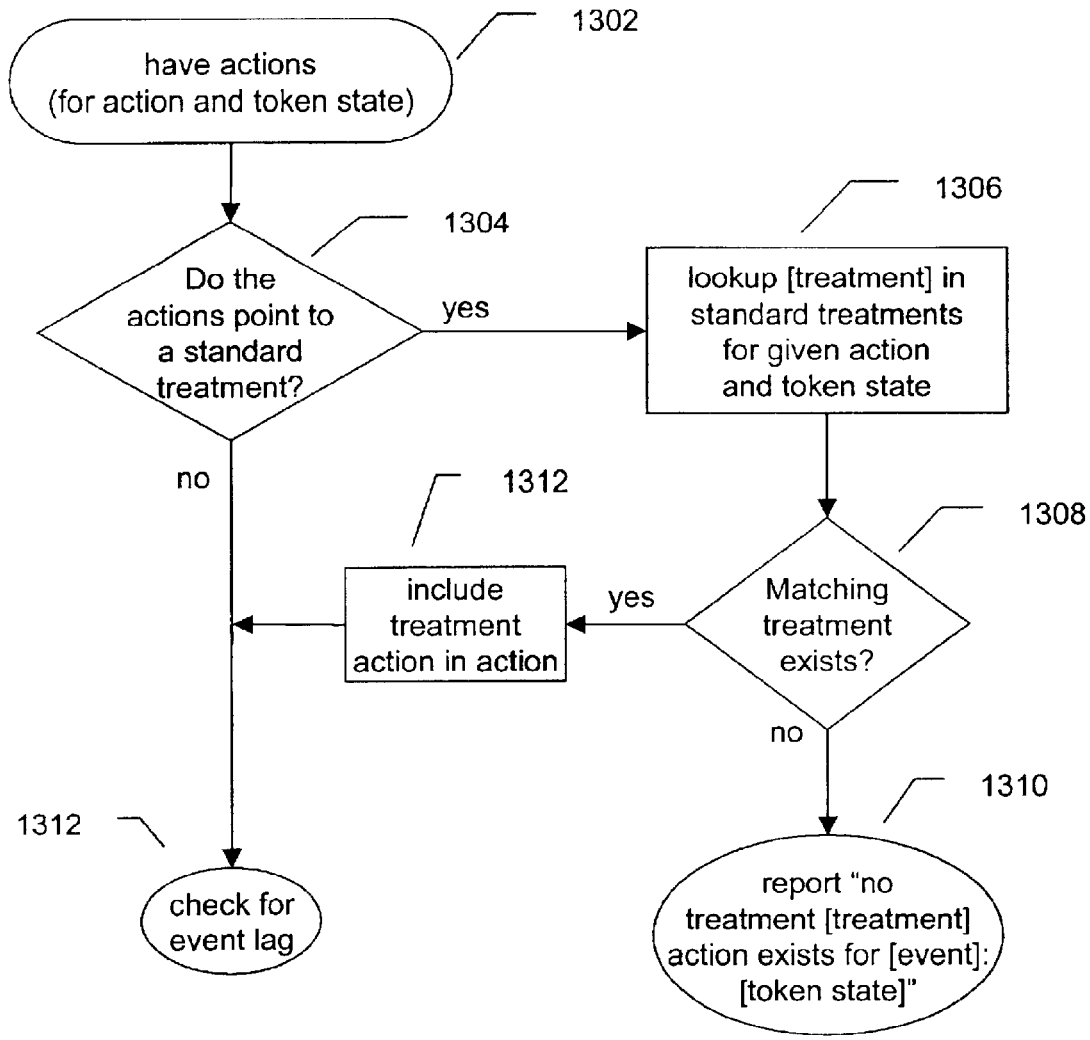
FIG. 13 is a flowchart of a procedure for checking if the token actions point to a standard treatment, and using that treatment.

FIG. 13 shows one embodiment of a procedure to check for standard treatments, and corresponds to 712. This is the idea that standard treatments can be defined and potentially referred to by multiple TAL entries. The procedure begins having actions 1302 that may potentially point to standard treatments. If the actions point to standard treatment 1304 then the procedure looks up the standard treatment 1306. If the standard treatment exists 1308 among the defined standard treatments, then the action of the standard treatment is considered to be the action of the token 1312. The procedure then continues by checking for an event lag 1312. If the standard treatment action is not found in the defined standard treatments, an error can be reported to the operator 1310.

In one implementation, the system keeps track of which treatments have been called for the given token, so that a treatment does not inadvertently wind up calling itself and thus causing infinite recursion. One method is to prevent actions from the "standard treatments" file from calling other standard treatments.

FIG. 14 shows one embodiment of the "check for event lag" procedure, and corresponds to 714. If a token action has an event lag, then the action is to be executed a given amount of time after the event actually occurs (or most recently occurs). The system begins by having a token action match 1402. If there are multiple token action matches, then this sub-procedure would be called for each. If the event is an alarm event 1404, then this means that the time lag has probably passed. Alarm events are instigated in the TLM by a procedure that scans alarms recorded in the Event Log. An example of such procedure is shown in FIG. 18.

If the event is an alarm event, and if the alarm is already handled 1410 then the procedure simply returns 1412 without handling the alarm again. Note that in one embodiment, alarm events can trigger actions that reset the alarm or set other alarms to provide for recurring alarm events.

If the alarm event is not yet handled 1410, then the TLM may take the precaution of assuring that the alarm is accurately recorded in the event log. This includes determining that the alarm time is the appropriate lag amount from the last occurrence time for the given object and event. Such precaution is necessary for various reasons, including the possibility that the lag value may have been changed from its original value.

Subsequently, the TLM checks that the alarm time has indeed passed 1416. If the alarm time has not passed, the there is no need to perform the actions pertaining to the alarm event at this time 1418. However, if the alarm time has indeed passed, the procedure continues by confirming and processing the actions. It is assumed that a procedure such as shown in FIG. 18 will trigger an alarm event at the time that the given alarm time has passed.

If the event is not an alarm event, it is still necessary to determine if it should set up an alarm event. This is specified by the presence of a non-zero event lag 1406. If there is a non-zero event lag, then the actions should not be performed until some time in the future, as specified by the event lag value. Therefore, the procedure should assure that the Event Log accurately records the accurate event and alarm information. This may include creating a new entry in the Event Log 300, or updating an appropriate entry already in the Event Log.

If the event is not an alarm event 1404, and there is a non-zero event lag 1406, then it is unlikely that the alarm time has passed 1416. Under such conditions the TLM will return 1418 without processing the actions. Again, it is assumed that a procedure such as shown in FIG. 18 will trigger an alarm event at the time that the given alarm time has passed.

If the event is not an alarm event 1404, and there is no event lag 1406, then the TAL entry would be considered to involve an immediate event, or an event whose corresponding actions for the given token should be executed immediately upon the occurrence of the object event. Therefore, the procedure continues processing the actions 1408.

Figure 15:
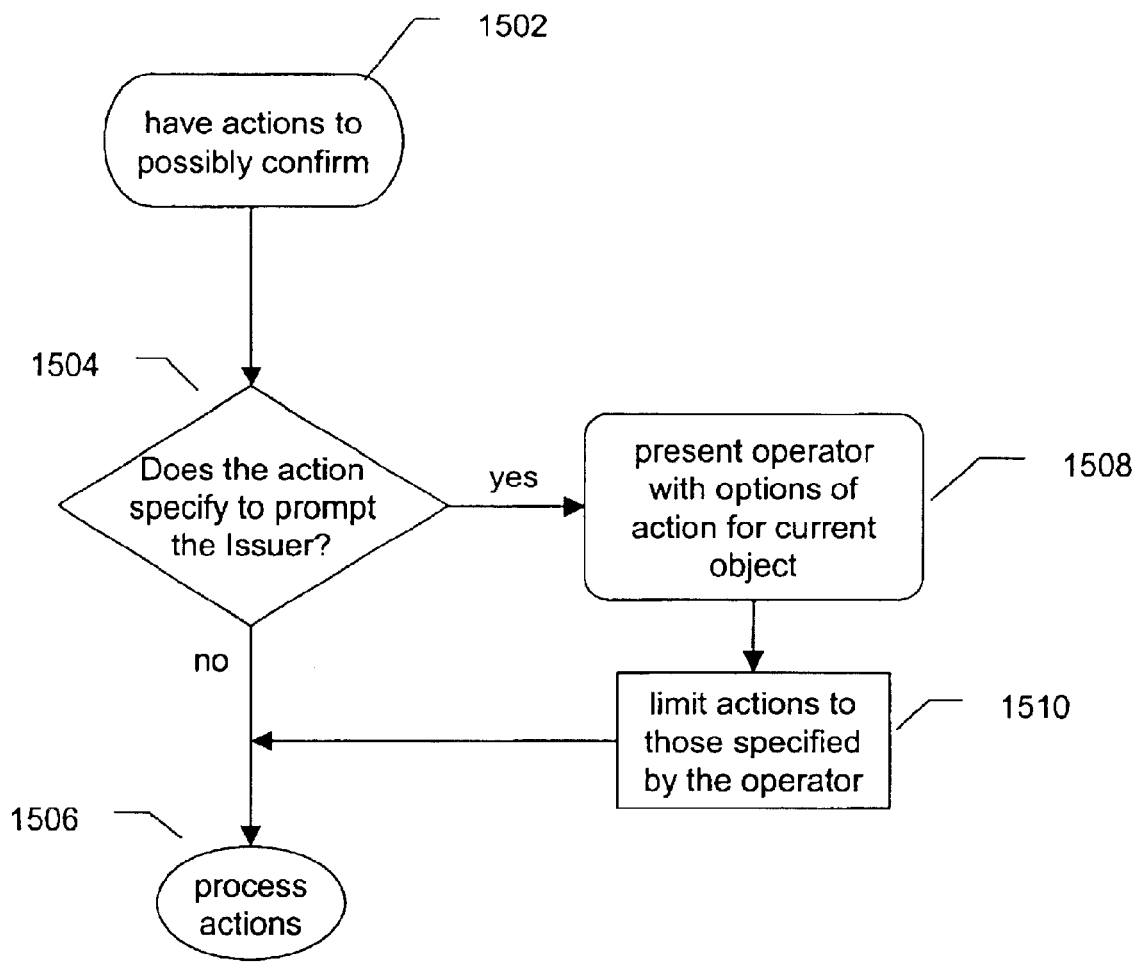
FIG. 15 is a flowchart of a procedure for confirming which specific actions should be executed.

FIG. 15 shows one embodiment of the "confirm actions" procedure 716. This allows for the possibility that the system operator desires or needs to be prompted about actions to perform 1504. If the operator has specified to be prompted for actions, then the action set to be performed 1510 is limited by the indicated preferences of the issuer 1508. Whatever actions result from the operator preferences are then processed 1506, which is detailed in the subsequent figure. Of course, the "confirm actions" procedure is optional, and would not be useful in some applications of this invention.

Figure 16:
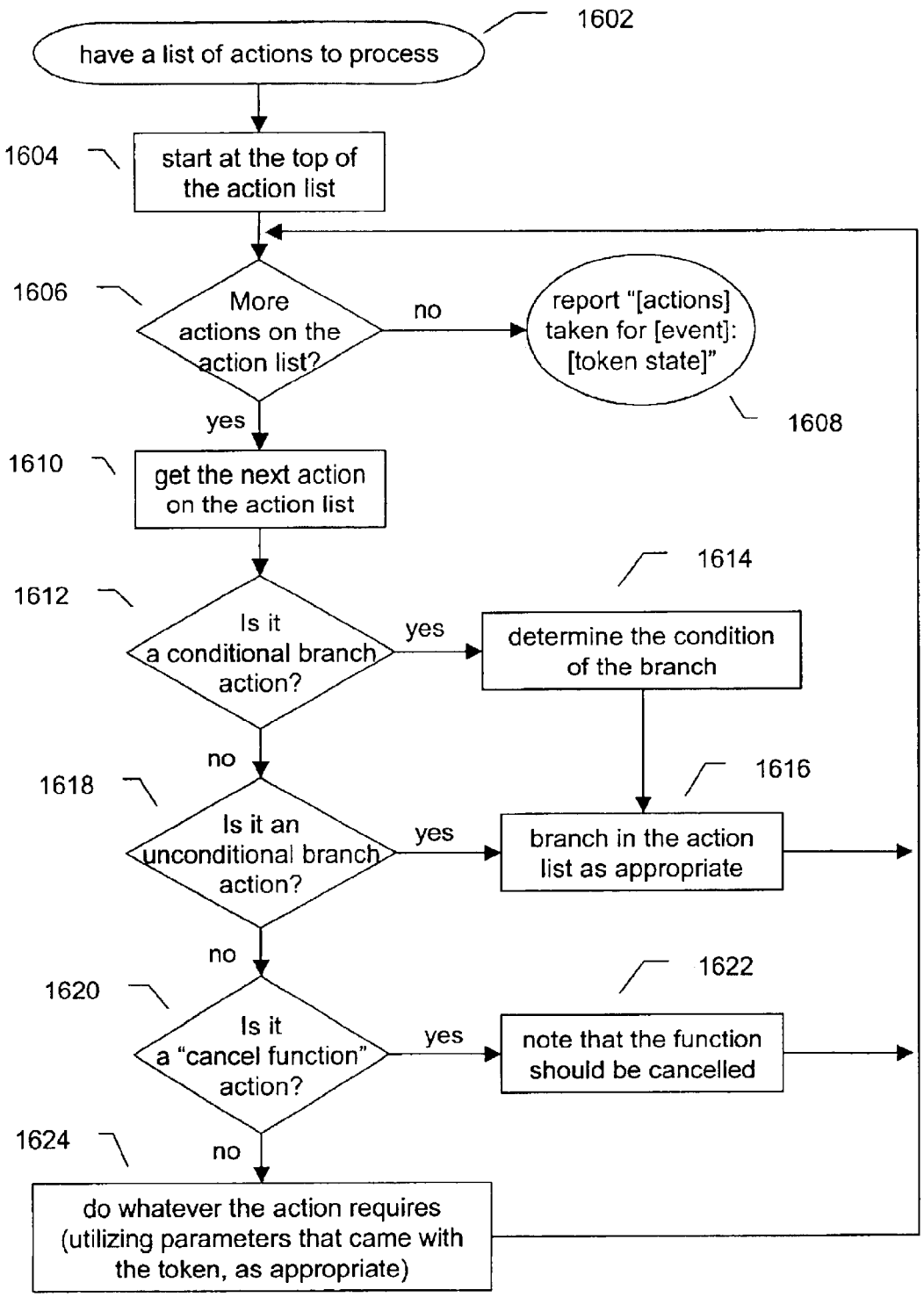
FIG. 16 is a flowchart of a procedure for processing the appropriate actions.

FIG. 16 corresponds to the "process actions" procedure 718. The procedure begins with a set of actions 1602, such as obtained from the procedure of the prior figures. Since there may be multiple actions, the procedure starts at the top of the action list 1604. If there are no more actions on the list 1606 then the procedure is done and can report what happened 1608.

If there are more actions to be processed, the procedure gets the next action on the list 1610. If it happens to be a conditional branch 1612, the procedure determines the condition that causes the branch 1614 and branch as appropriate 1616. An example of a conditional branch is "if the file contains audio data, play the file with an audio playing program." (The verb "branch" is used in the programming sense: to proceed with a different command in the action list.) If it is an unconditional branch action 1618, the branch is taken 1616 without the need to check a condition.

As another example of a special action, the TLM considers if the current action is a "cancel function" action 1620, which means the function that initiated the event should not be performed. If such was the command, it is noted 1622, so that this information can be returned back to the calling procedure (and the function can indeed be canceled). Another special action not shown in this figure might be a "un-cancel function" action which would reverse the effect of a "cancel function" action (by resetting the note to cancel the function).

There could be any number of other actions that might be specified in a token action log entry. Functions of the host system could be token actions. If the host system were a messaging system, actions might include sending messages, deleting messages, filing messages, etc. Other token actions might involve the TLM, such as modifying a TAL entry. Other token actions might involve the overall system, such as notifying the operator of the system via audio or visual alerts, initiating a hardware device, or executing a software program. The actions available for use with tokens will depend on the specific implementation, and are not restricted by this patent.

Generically, the actions are performed 1624. Note that the actions may possibly utilize parameters that are stored with the token and which were noted previously 810, or may utilize token conditions recorded in the specific token action log entry 204. This procedure repeats itself until all actions on the action list have been appropriately addressed.

Figure 17:
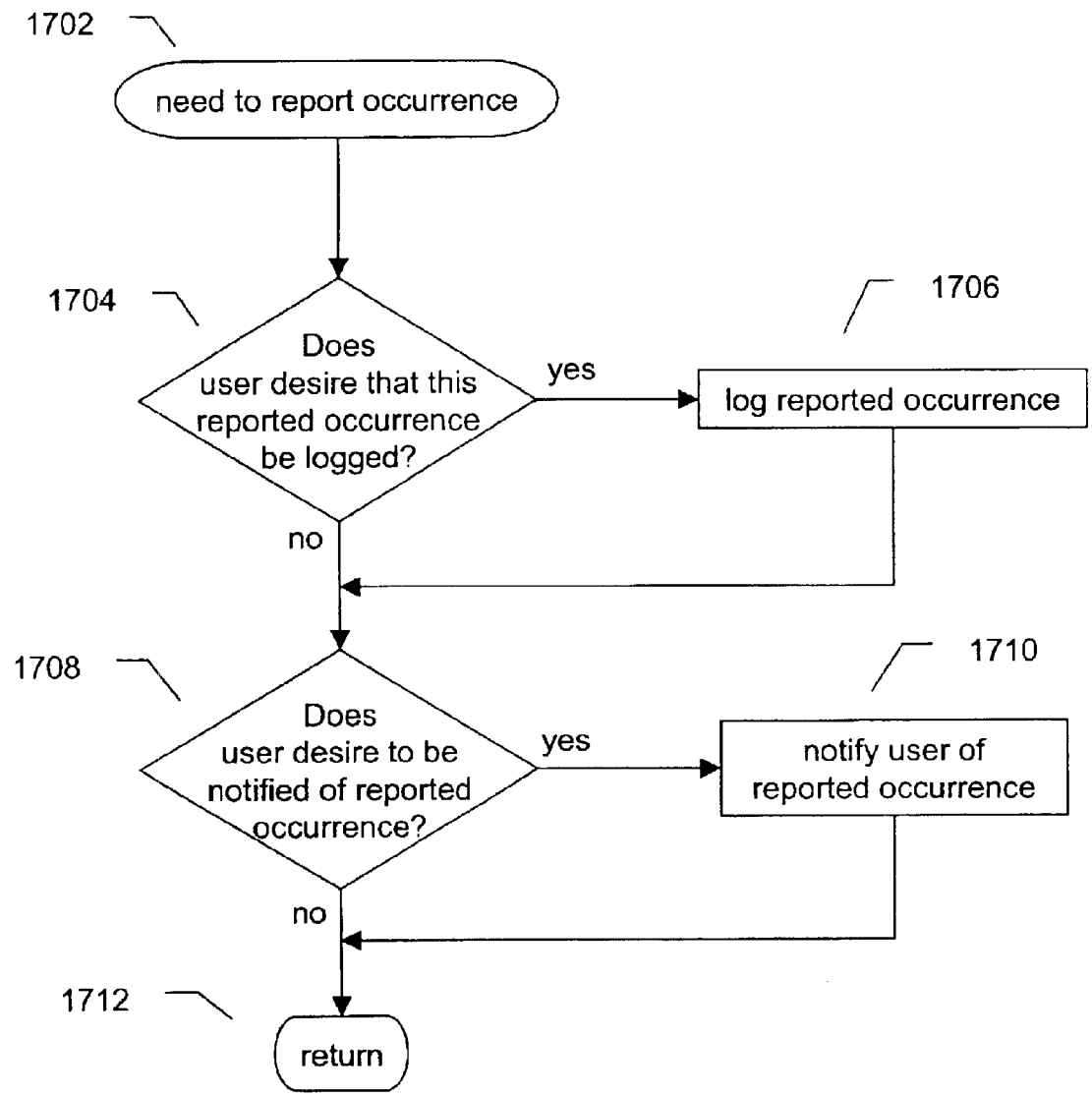
FIG. 17 is a flowchart of a procedure for optionally reporting and logging an occurrence.

FIG. 17 corresponds to the "report occurrence" procedure 711, 1206, 1310, and 1608. This procedure provides for the opportunity of reporting any TLM occurrence that may occur. In one embodiment, the procedure begins by being given a specific occurrence to possibly report 1702.

Two possible ways of "reporting" are considered here, although there may be others. First, the occurrence might be logged 1704, which is to note the occurrence in some type of log file 1706. Second, the system operator might desire to be notified of this given type of occurrence 1708. For example, the TLM might notify the user 1710 by sounding a beep and displaying a file, etc. In other cases, no reporting is done.

After reporting the occurrence as desired, the procedure returns to the calling procedure 1712. As mentioned previously, this may include returning a flag or other indicator about whether the token actions specified to cancel the initiating function.

FIG. 18 depicts one embodiment of a procedure for polling the Event Log to determine when the actions corresponding to lagged events should be processed. Even though the procedure has a start point 1802, it is assumed that this procedure continues to execute on an ongoing basis, perhaps as a system service. The system checks to see if one of the alarm times recorded in the Event Log has passed 1804. There may be many event times recorded in the Event Log, but the non-handled alarm that is chronologically first is generally the most important to watch. If no non-handled alarms have passed, then the system simply waits until one has passed 1806.

When an alarm time recorded in the Event Log has passed, the procedure initiates a token event that is an alarm event 1808, which follows the procedure as outlined in FIG. 7 and figures subsequent to FIG. 7. After the TLM has handled the alarm event, it is necessary to record that the given alarm event has been handled 1810. This effectively "turns off" the alarm so that it does not accidentally execute again. However, in another embodiment an alarm event action might create additional Event Log entries, thus providing for recurring actions following a given event.

Figure 19:
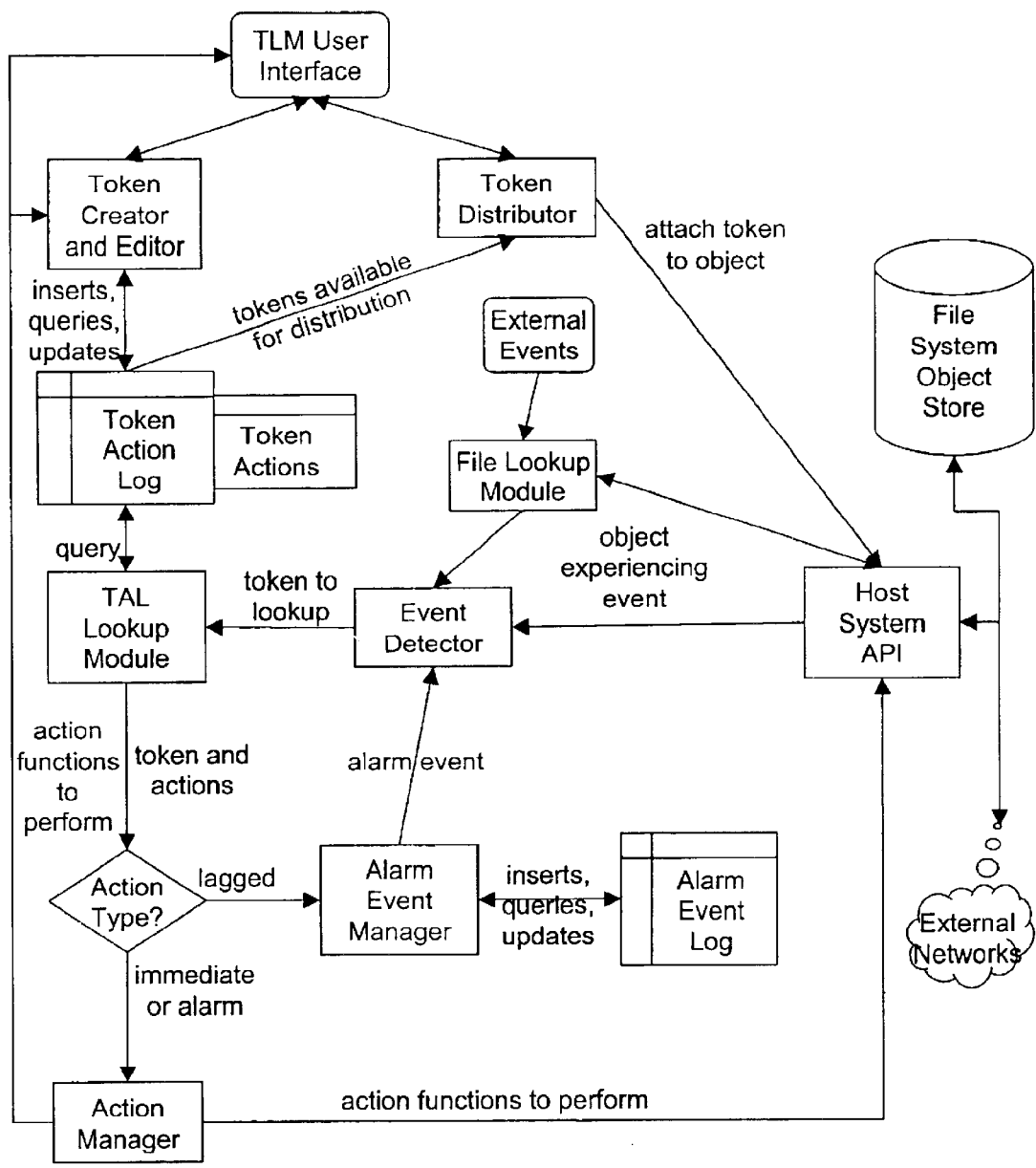
FIG. 19 is a block diagram of a Token Log Manager, as it relates to a system in which it operates.

FIG. 19 depicts one embodiment of a TLM-system as it would interact with the "host system" or "parent system" in which the TLM operates. The TLM is depicted within the dotted box, and it is shown that the TLM interacts with the host system and thereby with the file system and external networks. Not shown is that the TLM may also interact with other elements of the host system, such as system memory, peripherals, or input devices.

Some of the key elements of a TLM system are illustrated in FIG. 19, and include the following:

In one embodiment, a TLM User Interface is provided for the system operator to control the TLM, and especially to manage the entries of the TALs.

In one embodiment, a Token Creator and Editor is provided to create entries in the TAL and/or allow the operator or the system to modify entries in the TALs.

In one embodiment, a Token Distributor is provided to distribute tokens by attaching them to various file system entities or objects.

In one embodiment, a Token Action Log (TAL) is provided to store tokens actions, and other token information. Not shown in FIG. 19 are other TALs, such as Standard Treatments shared by multiple tokens.

In one embodiment, an Event Detector is provided to receive reports of events from the host system or from alarm events generated within the TLM. Other events may enter the system which are external to the file system and the TLM. These external events indicate one or more specific tokens which may be associated with one or more file system entities.

In one embodiment, a File Lookup Module is provided to lookup file system entities associated with a given token that is indicated by an external event. For example, the external event "after construction-project completed" might trigger the looking up of all file system objects associated with a "construction-project" token.

In one embodiment, a TAL Lookup Module is provided to identify which one or more TAL entries pertain to a given event for a given object.

In one embodiment, an Alarm Event Manager is provided to keep an Event Log that includes notation of alarm events corresponding to lagged event activities of specific file system entities or tokens. The Alarm Event Manager also triggers alarm events at the appropriate time as noted in the Event Log.

In one embodiment, an Action Manager is provided to execute appropriate actions indicated for the given token associated with the given file system entity or entities. These actions may be functions within the TLM itself, such as the modification of a given TAL entry. Or, the actions may be function pertaining to the host system, such as sending an email message if the host system happens to be an email client.

Each of the modules described herein may be implemented using any suitable combination of software and/or hardware. In certain embodiments, the functionality of two or more modules may be combined into a single module. Alternatively, two or more modules may be used to implement the described functions of a single module.

FIG. 20 illustrates one embodiment of a data structure for a TAL and related files. The TAL itself may be by a series of related tables, such as those enclosed in the dashed box. The five data tables include in this embodiment of a TAL include the following:

a "Tokens" table. Each of one or more entires includes the token itself (or the token pattern), a treatment that provides standard treatment actions for this token, the intended purposes of the token, a description of the token, the priority of the token (when a given file-system object is associated with multiple tokens, the token priority tells which tokens' actions should be addressed first). Other useful meta-information in that table is a count of the number of time the token actions have been initiated (uses), and the data and time the token was last used (to help see token activity). Finally, the table may include a flag as to whether the token is disabled, in case the system operator desires to temporarily disable all actions associated with the given token.

a "Token Actions" table, which identifies the one or more actions pertaining to each given token. This table might include reference to a "Settings" table and setting values. The "Settings" table describes various common settings that may pertain to tokens, and will be described below. The "Token Actions" table would also include relevant information about when the actions should be executed, such as the event, the event lag, the action priority, and any conditions. When multiple actions match for a given event, the action priority indicates which of the actions should be executed first. A final field that might be included in a Token Actions table is a flag that allows the system operator to temporarily disable specific actions.

a "Token Variables" table allows the tokens to have variables that can be manipulated by token actions. For example, a token that automatically backs up files may need to track the last time the backup was performed, to then calculate when the backup interval has passed again. As such, a "last backup date" variable might be associated with that token. Or, a token that is used to tally RSVP counts for categories "will attend," "will not attend," and "undecided" might have token variables for those categories to keep track of the RSVP counts.

a "Token Use Log" is a table that might simply track individuals who use the given token. The example shown in FIG. 20 is as might exist in an email system. It tracks who the people are that use a given token, as well as their email addresses. This information would be valuable if the token limited the number of times a given sender can use the token with a message (as counted in the uses field). The information might also be valuable to identify individuals who have not used the token for a significant amount of time (as tracked in the last_used field).

a "Token Issuance" table may indicate which file-system entities the given token has been associated with, or which external users the given token has been sent to. The latter example again pertains to use of a TAL in an email system embodiment, as might be illustrated in FIG. 20. There, in addition to tracking who the token has been issued to, it also tracks their email address and domain, which can be useful if the token action conditions limit the use of the token to individuals or domains that have had the token previously issued. The "Token Issuance" table might also track the issue date and purposes for the token which were given at the time of issuance. This is useful because the actual purpose of the token might differ from the information portrayed to potential users of the token. For example, the actual use of a token issued to marketing companies might be to track "junk mail," but the company might be told that the token is to be used for "general correspondence." Again, the "Token Issuance" table might track the when the given token has been used by the given person (or for the given file-system entity), and the future use of that token for that person (or entity) might be temporarily disabled.

Again, these five tables represent one embodiment of the TAL concept. The other three tables depicted in FIG. 20 may also be useful in a TLM system.

an "Alarm Event Log" table was described in FIG. 3, and its use, in one embodiment, was described in FIG. 14 and FIG. 18. For a description of the possible fields of such an Event Log, see the discussion of FIG. 3.

a "Possible Events" table simply records id values for the various types of file-system events that can initiate actions as recorded in a TAL. One purpose of the "Possible Events" table is to allow for a degree of normalization of the other tables that refer to specific events. Instead of referring to events by their full descriptions in a table, the corresponding event id can be noted.

as mentioned previously, a "Settings" table can be useful in identifying common settings that may pertain to various tokens. This primarily has the purpose of facilitating a user-friendly user interface for creating tokens and specifying the token actions. Rather than manually coding and entering token actions into the "Token Actions" table within the TAL, the user might simply select from a set of choices listed in the Settings table. The settings might involve values to be specified by the user, as depicted in FIG. 21. The settings might be associated with specific token actions via the setting_id fields, which would allow the user to change the settings corresponding to specific token actions without having to manipulate the "Token Action" entries directly.

FIG. 21 shows some examples of common "Settings" in one application of a TLM system. These settings were alluded to in FIG. 4 and FIG. 5. Not all fields of a "Settings" table are shown in FIG. 21, but enough to illustrate the concept. The following are some highlights of that figure:

A "No Overwrite" setting would make a token prevent associated files from being overwritten. The triggering event is [before file written] and the action is to alert the operator that the "File is read only" and subsequently cancel the write function. Both the "No Overwrite" and the "No Delete" settings might be used for a token that is designated for "Read Only" files.

A "Temporary" setting would be used for tokens that would be associated with temporary files. The TLM operator would need to specify the number of days after last use that the system should automatically delete the file, or accept the default value of 7 days. (FIG. 21 items in {braces} are values that can be provided by the operator to indicate preferences in token behavior.) When that lagged event occurs, the action is to delete the file.

An "Important" setting contains action logic that tests whether the operator confirms that the file should be deleted. Conditional logic then either moves the file to an archive directory (if the operator agrees to delete), otherwise cancels the delete function.

The "Auto-backup" setting specifies that files associated with the given token would be automatically backed up to a given location (indicated by {value1}) after the given file is closed.

The "Personal" setting includes a condition in the conditions field. That condition is that the operator gives the correct password (indicated by {value1}) in order to open the file. Note that setting values are recorded on the "Token Actions" table of FIG. 20. The conditions may be included as part of the actions, or in a separate field, depending on the implementation.

Again, the examples given in FIG. 21 are for illustration purposes, but are not intended to specify how settings must be configured in any given application of the invention. Other and different settings might exist for other applications. For example, the following are settings that might pertain to an implementation of a TLM system in a email messaging context. (Titles and descriptions are given, followed by token actions that include [events] and conditions. Again, items in {braces} represent preference options that might be provided by the system operator.)

Valid Senders: Sender's address must be in token's Issuance list, otherwise send {reply message} and file in {folder}. (token actions: [after message received] if(message.from not in token.issuance) reply({reply message}); file_in({folder});stop;

Uses: Only allow this token to be received {number} times, otherwise send {reply message} and file in {folder}. (token actions: [after message received] if(update(token.uses)>{number}) reply({reply message}); file_in({folder});stop;)

User Uses: Only allow token to be used {number} times from a given address, otherwise send {reply message} and file in {folder}. (token actions: [after message received] if(update(token use_log))>{number}) reply({reply message}); file_in({folder});stop;)

Expiration: This token expires {days} days after {event}, otherwise send {reply message} and file in {folder}. (token actions, [after message received] if(now>date({days} days after {event})) reply ({reply message}); file_in({folder});stop;)

Expiration Date: This token expires on {month} {day}, {year}, otherwise send {reply message} and file in {folder}. (token actions: [after message received] if(now>date({day}-{month}-{year})) reply({reply message}); file_in({folder});stop;)

Attachments: Remove attachments with total size greater than {size} KB, otherwise send {reply message} and file in {folder}. (token actions: [after message received] if(message.attachment_size>{size}) remove (message.attachments); reply({reply message}); file_in({folder});)

Images: Remove images with total size greater than {size} KB, otherwise send {reply message} and file in {folder}. (token actions: [after message received] if(message.image_size>{size}) remove (message.images); reply({reply message}); file_in ({folder});)

To Plain Text: Convert received messages to plain text. (token actions: [after message received] if(to_plain_text(message.body)))

Messages: Truncate messages larger than {size} KB, otherwise send {reply message} and file in {folder}. (token actions: [after message received] if(message.body_size>{size}) truncate(message.body, {size}); reply({reply message}); file_in({folder});)

Sound Alert: When message received play the sound {sound}. (token actions: [after message received] play ({sound});)

Subject Font: Set message subject font to {font size} {font color} {font style}. (token actions: [after message received] set(message.list_font, {font size}-{font color}-{font style});)

Icon: Show message with the icon {icon}. (token actions: [after message received] set(message.icon,{icon});)

Auto-Reply: Any received message, then send {reply message} and file in {folder}. (token actions: [after message received] reply({reply message}); file_in ({folder});)

Auto-Forward: Forward message to {address}. (token actions: [after message received] forward({address});)

When Received: When message Received, then send {reply message} and file in {folder}. (token actions: [after message received] reply({reply message}); file_in({folder});)

When Read: When message Read, then send {reply message} and file in {folder}. (token actions: [before message read] reply({reply message}); file_in ({folder});)

When Archived: When message Archived, then send {reply message} and file in {folder}. (token actions: [before message archived] cancel; reply({reply message}); file_in({folder}); cancel;)

When Deleted: When message Deleted, then send {reply message} and file in {folder}. (token actions: [before message deleted] cancel; reply({reply message}); file_in({folder}); cancel;)

Amount: Amount of transaction no more than ${amount}, otherwise send {reply message} and file in {folder}. (token actions: [after message received] if({token.parameter(amount)}>{amount}) reply({reply message}); file_in({folder});stop;)

Vendor: Vendor name must begin with {vendor}, otherwise send {reply message} and file in {folder}. (token actions: [after message received] if(token.parameter (vendor) not begins {vendor}) reply({reply message}); file_in({folder});stop;)

Validate: Otherwise, respond that TAT is valid, otherwise send {reply message} and file in {folder}. (token actions: [after message received] reply({reply message}); file_in({folder});)

Archive Message: automatically {days} days after {event}, by send {reply message} and file in {folder}. (token actions: (event) reply({reply message}); file_in({folder});)

Delete Message: automatically {days} days after {event}, by send {reply message} and file in {folder}. (token actions: (event) reply({reply message}); file_in ({folder});)

Archive Token: automatically {days} days after {event}. (token actions: {event}set(token.status,archived);)

Delete Token: automatically {days} days after {event}. (token actions: {event}set(token.status,deleted);)

RSVP count: Count the response options {option set}. (token actions: [after message received] if(token_parameter(rsvp) matches {option set}); inc_token variable(rsvp-token_parameter(rsvp), 0); inc_token_variable(rsvp-token_parameter(rsvp)); else; init_token variable(rsvp-other, 0); inc_token_variable (rsvp-other);)

RSVP sort: Sort the response options {option set} in {folder}. (token actions: [after message received] if(token_parameter(rsvP) matches {option set}); set (message.folder, {folder}/token_parameter(rsvp)); else; set(message.folder, {folder});)

Custom Action 1: Event: {event} Actions: {actions}. (token actions: [{event}]{actions})

Custom Action 2: Event: {event} Actions:{actions}. (token actions: [{event}]{actions})

Custom Action 3: Event: {event} Actions:{actions}. (token actions: [{event}]{actions})

Address Book: Accept message in address book, then send {reply message} and file in {folder}. (token actions: [after message received] if(message.from in address_book) set(message.newmail,yes); reply ({reply message}); file_in({folder});)

Token Request: Delete body of message requesting a token, then send {reply message} and file in {folder}. (token actions: [after message received] if(message.subject like "request*" remove (message.body); set(message.newmail,request); reply ({reply message}); file_in({folder});)

Tokenless: Delete tokenless messages, then send {reply message} and file in {folder}. (token actions: [after message received] if(message.newmail< >"no") set (message.newmail,no); reply({reply message}); file_in({folder});stop;)

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for managing a file system comprising:
providing a token action log as a data structure that contains user-extensible set of tokens, each token including a set of symbols;
storing new entry in the token action log comprising:
 a) a new token as a set of symbols that together have no prior functional meaning within the file system,
 b) one or more user-customizable sets of actions associated with the new token, and, c) an indication of a specific event that is designated to trigger the one or more user-customizable actions;

attaching the new token to one or more file-system entities such that the token is stored together with each attached file-system entity;

detecting an event involving a file-system entity that has an attached token, which token is from the set of tokens previously stored in the token action log;

identifying the attached token stored with the file-system entity involved in the detected event;

retrieving from the token action log one or more actions are associated in the token action log with the identified token and the detected event; and executing the retrieved actions.

2. The method of claim 1, wherein the file-system is a system that stores an organized collection of information entities.

3. The method of claim 1, wherein the file-system entities are one or more of files, directories, links to files, links to directories, data structures, data structure elements, images, video data, audio data, messages, and message attachments.

4. The method of claim 1, wherein storing a new entry in the token action log includes receiving a configuration from a system operator of a specific token.

5. The method of claim 4, wherein storing a new entry in the token action log includes receiving a configuration from a system operator of a configuration of a second specific token.

6. The method of claim 1, wherein storing a new entry in the token action log includes receiving the configuration of the one or more tokens from an external source.

7. The method of claim 1, wherein storing a new entry in the token action log includes one or more of recording the token in system memory, recording the token on a system storage device, and recording the token on an external device.

8. The method of claim 1, wherein the event is selected from the set consisting of deleting the file-system entity, opening the file-system entity, copying the file-system entity, printing the file-system entity, receiving the file-system entity over a network connection, sending the file-system entity over a network connection, backing up the file-system entity, moving the file-system entity, executing the file-system entity, creating the file-system entity, modifying the file-system entity, and associating a token with the file-system entity.

9. The method of claim 1, further comprising:

associating one or more time-dependent alarms with one or more tokens and one or more token actions as recorded in the token action log.

10. The method of claim 9, wherein the event comprises passing a designated time as indicated by one or more alarms associated with one or more tokens.

11. The method of claim 1, wherein the token action log is stored in the file system.

12. The method of claim 1, wherein the token action log is stored outside of the file system.

13. The method of claim 1, wherein the token action log is affiliated with a given user of the file system.

14. The method of claim 1, wherein the token action log is affiliated with a given group of users of the file system.

15. The method of claim 1, wherein specific entries in the token action log are affiliated with a given user of the file system.

16. The method of claim 1, specific entries in the token action log are affiliated with a given group of users of the file system.

17. The method of claim 1, wherein specific tokens together with specific file-system entities comprises including one or more tokens in a set of extended attributes pertaining to specific file-system entities.

18. The method of claim 1, wherein storing specific tokens together with specific file-system entities comprises storing the token in meta-information which is stored with the file-system entities.

19. The method of claim 1, wherein storing specific tokens together with specific file-system entitles comprises recording in a data structure which tokens are considered attached to specific file-system entities.

20. The method of claim 1, further comprising:

detecting an event involving a file-system entity associated with a specific token previously stored within the file system;

searching the token action log for a set of one or more actions associated with the specific token; and executing the set of one or more actions.

21. The method of claim 20, wherein the file-system entity is accompanied by a second specific token previously stored within the file system, the method further comprising:

searching the token action log for a second set of one or more actions associated with the second specific token; and executing the second set of one or more actions.

22. The method of claim 1, further comprising:

detecting an event that pertains to a specific token previously recorded in the token action log;

identifying entities within the file system that are associated with the specific taken pertaining to the detected event;

searching the token action log for a set of one or more actions associated with the specific token; and executing the set of one or more actions for each of the identified files-system entities.

23. The method of claim 1, wherein at least one action includes conditional logic.

24. The method of claim 1, wherein the identified token is accompanied by a set of parameters, and wherein executing the set of one or more actions comprises calling a function with the set of parameters.

25. The method of claim 20, wherein the identified token is associated with one or more conditions for use, and wherein searching the token action log includes verifying that the one or more conditions for use are satisfied.

26. The method of claim 1, wherein at least one token is associated with an indication of an intended purpose for the at least one token.

27. The method of claim 1, wherein attaching the new token to one or more file-system entities comprises associating multiple tokens with different purposes to two or more file-system entities.

28. The method of claim 1, wherein attaching the new token to specific entities comprises associating multiple tokens with different purposes to one file-system entity.

29. The method of claim 1, further comprising:

associating two or more actions in the token action log to different specific events.

30. The method of claim 1, wherein at least one action in the token action log includes a reference to one or more standard action sets.

31. A system comprising:

a token action log including a user-extensible set of tokens, each token being a set of symbols, at least one entry in the token action log comprising:

a) a new token as a set of symbols that together have no prior functional meaning within the file system,
b) one or more user-customizable actions associated with the new token, and,
c) an event that is designated to trigger the one or more user-customizable actions, wherein the new token is to be attached to one or more file-system entities such that the token is stored together with each attached file-system entity;

an event detector to detect an event involving a file-system entity that has an attached token previously stored within the file system;

a lookup module to search the token action log for a set of one or more actions associated with the specific token; and an action manager to execute the set of one or more actions.

32. The system of claim 31, wherein the event is selected from the set consisting of deleting the file-system entity, opening the file-system entity, copying the file-system entity, printing the file-system entity, emailing the file-system entity, backing up the file-system entity, moving the file-system entity, executing the file-system entity, creating the file-system entity, modifying the file-system entity, and associating a token with the file-system entity.

33. The system of claim 31, wherein the event comprises passing a designated time.

34. The system of claim 31, wherein the file-system entity is accompanied by a second specific token previously stored within the file system, and wherein the lookup module is to search the token action log for a second set of one or more actions associated with the second specific token; and wherein the action manager is to execute the second set of one or more actions.

35. The system of claim 31,
wherein the event detector is to detect a file-system entity experiencing an event, which file-system entity is accompanied by a specific token previously stored within the file system; and
wherein the lookup module is to search the token action log for a set of one or more time-lagged actions associated with the specific token; the system further comprising
an alarm event manager to initiate the actions after the designated time lag.

36. The system of claim 31, further comprising:
a subsystem to detect an event pertaining to one or more tokens recorded in the token action log; and
a search module to identify file-system entitles associated with the one or more tokens.

37. The system of claim 36, further comprising:
a processing module to process the identified file-system entities according to actions recorded in the token action log corresponding to the one or more tokens.

38. The system of claim 31, wherein each token corresponds to a group of file-system entities.

39. The system of claim 31, wherein the detection subsystem, In response to encountering a file-system entity without a token, associates the file-system entity with a designated token.

40. The system of claim 31,
wherein the event detector is to detect a file-system entity experiencing an event, which file-system entity is not accompanied by a token previously stored in the token action log;
wherein the lookup module is to search the token action log for a set of one or more actions associated with file-system entities that are not accompanied by a token; and
wherein the action manager is to execute the set of one or more actions.

41. The system of claim 31, wherein an action executed by the action manager is to attach one or more tokens to one or more entities already in the file system.

42. The system of claim 31, wherein at least one action is selected from the group consisting of tagging the file-system entity with an identifier, deleting the file-system entity, moving the file-system entity, activating a device, sending a file to a designated recipient, sending the file-system entity to a designated recipient, audibly alerting an operator of the file system, visually alerting an operator of the file system, extracting information from the file-system entity, modifying the token action log, generating a new token, executing a program, and setting an option in a program acting on the file system entity.

43. The system of claim 31, wherein at least one action includes conditional logic.

44. The system of claim 31, wherein the specific token is accompanied by a set of parameters, and wherein the action manager is to execute the set of one or more actions by calling a function with the set of parameters.

45. The system of claim 31, wherein the specific token is associated with conditions for use, and wherein the file system is to perform one or more operations in response to the conditions for use being satisfied.

46. The system of claim 31, further comprising:
a searchable data structure for recording which tokens have been assigned to which entities within the file system.

47. The system of claim 46, further comprising:
a subsystem for identifying within the searchable data structure the entities that have a specified token assigned to them.

48. The system of claim 47, further comprising:
a subsystem for presenting the identified entities to the file system operator.

49. The system of claim 47, further comprising:
a subsystem for performing a specific set of one or more actions on the identified file system entities.

50. A file-system management apparatus comprising:
means for providing a token action log as a data structure that contains a user-extensible set of tokens, each token being a set of symbols;
means for storing a new entry in the token action log comprising:
a) a new token as a set of symbols that together have no prior functional meaning within the file system,
b) one or more user-customizable actions associated with the new token, and,
c) an event that is designated to trigger the one or more user-customizable actions;
means for attaching the new token to one or more file-system entities such that the token is stored together with each attached file-system entity;
means for detecting an event involving a file-system entity that has an attached token previously stored within the file system;
means for searching the token action log for a set of one or more actions associated with the specific token; and
means for executing the set of one or more actions.

51. A computer program product comprising program code for performing a method, the method comprising:
- providing a token action log as a data structure that contains a user-extensible set of tokens, each token being a set of symbols;
- storing a new entry in the token action log comprising:
  a) a new token as a set of symbols that together have no prior functional meaning within the file system,
  b) one or more user-customizable actions associated with the new token, and,
  c) an event that is designated to trigger the one or more user-customizable actions;
- attaching the new token to one or more file-system entities such that the token is stored together with each attached file-system entity;
- detecting an event involving a file-system entity that has an attached token previously stored within the file system;
- searching the token action log for a set of one or more actions associated with the specific token; and
- executing the set of one or more actions.

52. A method for managing a file system comprising:
- providing a token action log as a data structure that contains a user-extensible set of tokens, each token being a set of symbols;
- storing a new entry in the token action log comprising:
  a) a new token as a set of symbols that together have no prior functional meaning within the file system,
  b) one or more user-customizable sets of actions associated with the new token,
  c) an indication of a specific event that is designated to trigger the one or more user-customizable actions, and
  d) an associated action lag-time which is the period of time after detecting the designated event before automatically executing the one or more user-customizable actions;
- attaching the new token to one or more file-system entities such that the token is stored together with each attached file-system entity;
- detecting an event involving a file-system entity that has an attached token, which token is from the set of tokens previously stored in the token action log;
- identifying the attached token stored with the file-system entity involved in the detected event;
- retrieving from the token action log the one or more actions and action lag-times which correspond to the identified token and the detected event;
- automatically executing each retrieved action that correspond to zero lag-time; and
- automatically setting an alarm for each non-zero action lag-time after the detected event time, at which alarm time the corresponding retrieved actions are to be automatically executed by the system.

53. A method for managing a file system comprising:
- providing a token action log as a data structure that contains a user-extensible set of tokens, each token being a set of symbols;
- storing a new entry in the token action log comprising:
  a) a new token as a set of symbols, and
  b) one or more actions associated with the new token, which actions are to be automatically executed in the event of an attempt to delete a file-system entity that has the new token attached;
- attaching the new token to one or more file-system entities such that the token is stored together with each attached file-system entity;
- detecting an event involving the deletion of a file-system entity that has an attached token, which token is from the set of tokens previously stored in the token action log;
- identifying the attached token stored with the file-system entity involved in the detected event;
- retrieving from the token action log the one or more actions which correspond to the identified token and the detected event;
- executing the retrieved actions.

54. A method for managing a file system comprising:
- providing a token action log as a data structure that contains a user-extensible set of tokens, each token being a set of symbols;
- storing a new entry in the token action log comprising:
  a) a new token as a set of symbols, and
  b) one or more actions associated with the new token, which actions are to be automatically executed at the event of receiving a file-system entity that has the new token attached via a communication network;
- attaching the new token to one or more file-system entities such that the token is stored together with each attached file-system entity;
- detecting an event involving receiving a file-system entity that has an attached token via a communication network, which token as from the set of tokens previously stored in the token action log;
- identifying the attached token stored with the file-system entity involved in the detected event;
- retrieving from the token action log the one or more actions which correspond to the identified token and the detected event; and
- executing the retrieved actions.

55. A method for managing a file system comprising:
- providing a token action log as a data structure that contains a user-extensible set of tokens, each token being a set of symbols;
- storing a new entry in the token action log comprising:
  a) a new token as a set of symbols, and
  b) one or more actions associated with the new token, which actions are to be automatically executed at the event of an attempt to modify a file-system entity that has the new token attached;
- attaching the new token to one or more file-system entities such that the token is stored together with each attached file-system entity;
- detecting an event involving an attempt to modify a file-system entity that has an attached token, which token is from the set of tokens previously stored in the token action log;
- identifying the attached token stored with the file-system entity involved in the detected event;
- retrieving from the token action log the one or more actions which correspond to the identified token and the detected event; and
- executing the retrieved actions.

56. A method for managing a file system comprising:
- providing a token action log as a data structure that contains a user-extensible set of tokens, each token being a set of symbols;

storing a new entry in the token action log comprising:
  a) a new token as a set of symbols, and
  b) one or more actions associated with the new token, which actions are to be automatically executed at the event of an attempt to move a file-system entity that has the new token attached;
attaching the new token to one or more file-system entities such that the token is stored together with each attached file-system entity;
detecting an event involving an attempt to move a file-system entity that has an attached token, which token is from the set of tokens previously stored in the token action log;
identifying the attached token stored with the file-system entity involved in the detected event;
retrieving from the token action log the one or more actions which correspond to the identified token and the detected event; and
executing the retrieved actions.

57. A method for managing a file system comprising:
providing a token action log as a data structure that contains a user-extensible set of tokens, each token being a set of symbols;
storing a new entry in the token action log comprising:
  a) a new token as a set of symbols, and
  b) one or more actions associated with the new token, which actions are to be automatically executed at the event of an attempt to execute a file-system entity that has the new token attached;
attaching the new token to one or more file-system entities such that the token is stored together with each attached file-system entity;
detecting an event involving an attempt to execute a file-system entity that has an attached token, which token is from the set of tokens previously stored in the token action log;
identifying the attached token stored with the file-system entity involved in the detected event;
retrieving from the token action log the one or more actions which correspond to the identified token and the detected event; and
executing the retrieved actions.

58. A method for managing a file system comprising:
providing a token action log as a data structure that contains a user-extensible set of tokens, each token being a set of symbols;
storing a new entry in the token action log comprising:
  a) a new token as a set of symbols, and
  b) one or more actions associated with the new token, which actions are to be automatically executed at the event of an attempt to access a file-system entity that has the new token attached;
attaching the new token to one or more file-system entities such that the token is stored together with each attached file-system entity;
detecting an event involving an attempt to access a file-system entity that has an attached token, which token is from the set of tokens previously stored in the token action log;
identifying the attached token stored with the file-system entity involved in the detected event;
retrieving from the token action log the one or more actions which correspond to the identified token and the detected event;
executing the retrieved actions.

* * * * *